United States Patent
Kroening

(10) Patent No.: US 10,979,135 B2
(45) Date of Patent: Apr. 13, 2021

(54) SYSTEMS AND METHODS FOR INCREASING CAPACITY IN A REDUNDANCY NETWORK

(71) Applicant: HONEYWELL INTERNATIONAL INC., Morris Plains, NJ (US)

(72) Inventor: Adam M. Kroening, San Diego, CA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/339,843

(22) PCT Filed: Oct. 5, 2017

(86) PCT No.: PCT/US2017/055267
§ 371 (c)(1),
(2) Date: Apr. 5, 2019

(87) PCT Pub. No.: WO2018/067779
PCT Pub. Date: Apr. 12, 2018

(65) Prior Publication Data
US 2020/0052781 A1 Feb. 13, 2020

Related U.S. Application Data

(60) Provisional application No. 62/405,740, filed on Oct. 7, 2016.

(51) Int. Cl.
*H04B 1/74* (2006.01)
*H04B 7/185* (2006.01)
*H04B 7/204* (2006.01)

(52) U.S. Cl.
CPC ........ *H04B 7/18515* (2013.01); *H04B 7/2041* (2013.01)

(58) Field of Classification Search
CPC ...... H04B 1/0021; H04B 1/0046; H04B 1/18; H04B 7/185; H04B 7/18515; H04B 7/204;
(Continued)

(56) References Cited

U.S. PATENT DOCUMENTS 4,061,989 A 12/1977 Petrelis
4,070,637 A * 1/1978 Assal ........................ H01P 1/10
333/105

(Continued)

FOREIGN PATENT DOCUMENTS

EP 2806567 A1 11/2014

OTHER PUBLICATIONS

Kroening, Advances in Ferrite Redundancy Switching for Ka-Band Receiver Applications, IEEE, 7 pages, Jun. 2016.*

(Continued)

*Primary Examiner* — Frank Duong
(74) *Attorney, Agent, or Firm* — Shumaker & Sieffert, P.A.

(57) ABSTRACT

A redundancy network is coupled to a first plurality of signal components and to a beam hopping network. The redundancy network has redundancy network signal junctions configurable to define redundancy network signal paths through the redundancy network, with one path for each signal component. The beam hopping network has beam hopping junctions configurable to define beam hopping signals paths from the redundancy network to other signal components. The beam hopping junctions are dynamically adjustable to reconfigure the beam hopping signals paths so signals from the redundancy network are deliverable to at least two of the other signal components. The redundancy network signal junctions are reconfigurable in response to a failure of one of the first signal components to redefine the (Continued)

redundancy network signal paths so that signals from the remaining first signal components are distributable, by the beam hopping network, to all of the other signal components.

20 Claims, 16 Drawing Sheets

(58) Field of Classification Search
CPC .. H04B 7/2041; H04B 10/0771; H04B 17/02; H04L 41/12; H04L 12/24; H04L 12/751; H04L 29/0604; H04L 43/50; H04J 3/14; H04J 3/18
See application file for complete search history.

(56) References Cited

U.S. PATENT DOCUMENTS

| | | | |
|---|---|---|---|
| 4,644,301 A * | 2/1987 | Hecht | H04B 1/74 333/101 |
| 4,837,580 A * | 6/1989 | Frazita | G01S 1/56 342/374 |
| 4,931,802 A | 6/1990 | Assal et al. | |
| 5,610,556 A * | 3/1997 | Rubin | H03F 3/602 330/124 D |
| 6,438,354 B2 | 8/2002 | Thompson et al. | |
| 7,369,810 B2 * | 5/2008 | Sichi | H04B 7/18515 333/101 |
| 8,340,015 B1 | 12/2012 | Miller et al. | |
| 8,509,144 B2 | 8/2013 | Miller et al. | |
| 8,542,629 B2 | 9/2013 | Miller | |
| 8,805,275 B2 | 8/2014 | O'Neill et al. | |
| 9,166,267 B2 | 10/2015 | Kroening et al. | |
| 9,472,837 B1 * | 10/2016 | Kroening | H01P 1/11 |
| 9,786,971 B2 | 10/2017 | Kroening | |
| 9,992,070 B2 | 6/2018 | Kroening | |
| 10,027,296 B2 * | 7/2018 | Gonzalez Esteban | H03F 3/24 |
| 2014/0286236 A9 | 9/2014 | Miller et al. | |
| 2014/0320227 A1 * | 10/2014 | Kroening | H04B 1/18 333/1.1 |
| 2015/0115737 A1 * | 4/2015 | Forney | H03K 17/002 307/115 |
| 2016/0013530 A1 * | 1/2016 | Kroening | H01P 1/11 333/1.1 |
| 2016/0156409 A1 | 6/2016 | Chang | |
| 2017/0155555 A1 * | 6/2017 | Kroening | H01P 5/12 |

OTHER PUBLICATIONS

Daneshmand et al, C-type and R-type RF MEMS Switches for Redundancy Switch Matrix Applications, IEEE, 4 pages, 2006.*
Daneshnnand et al, RF MEMS Satellite Switch Matrices, IEEE, 18 pages, Aug. 2011.*
International Search Report and Written Opinion of International Application No. PCT/US2017/055267, dated Dec. 11, 2017, 9 pp.
International Preliminary Report on Patentability from International Application No. PCT/US2017/055267, dated Oct. 25, 2018, 7 pp.
Burrows, "Design of Microwave Beam-Switching Networks," Technical Report 639, Dec. 5, 1983, 83 pp.
Extended Search Report from counterpart European Application No. 17859161.6, dated Jun. 3, 2020, 5 pp.
Notice of Intent to Grant and Text Intended to Grant dated Dec. 21, 2020, from counterpart European Application No. 17859161.6, 64 pp.

* cited by examiner

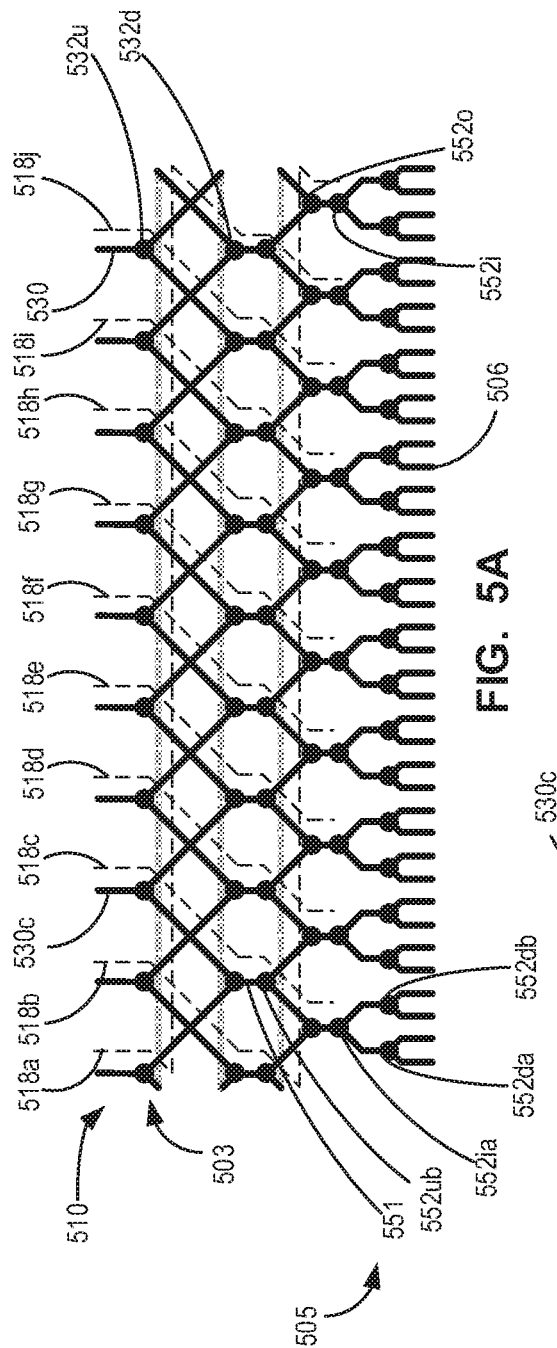
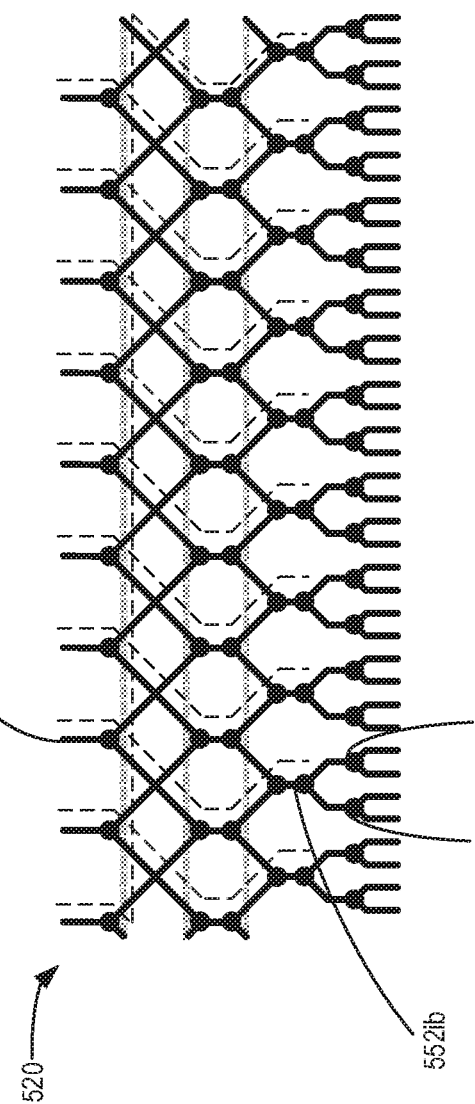
FIG. 5A
FIG. 5B

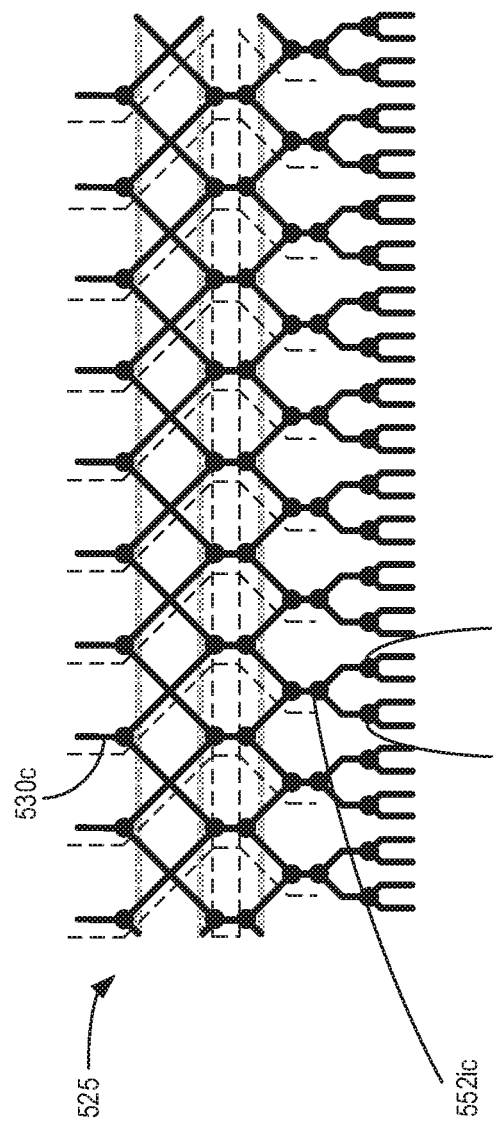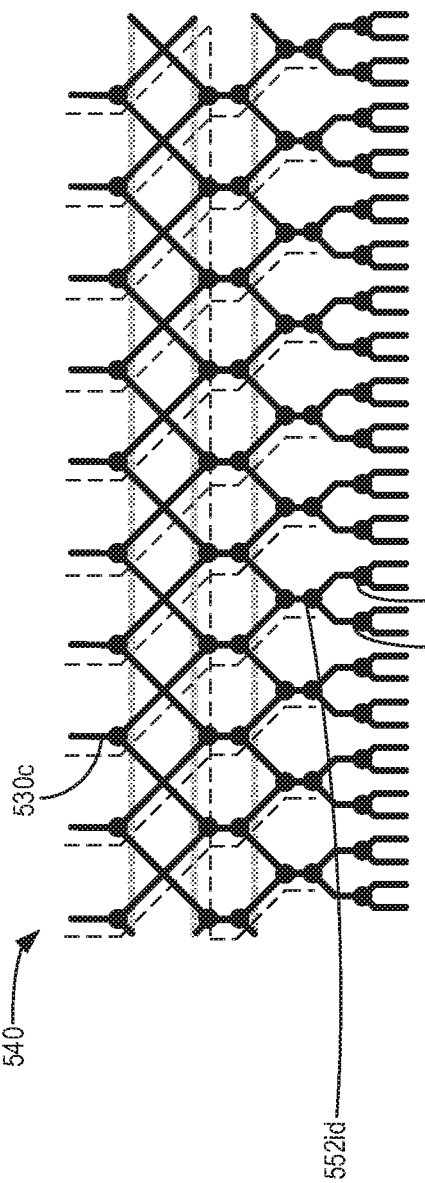

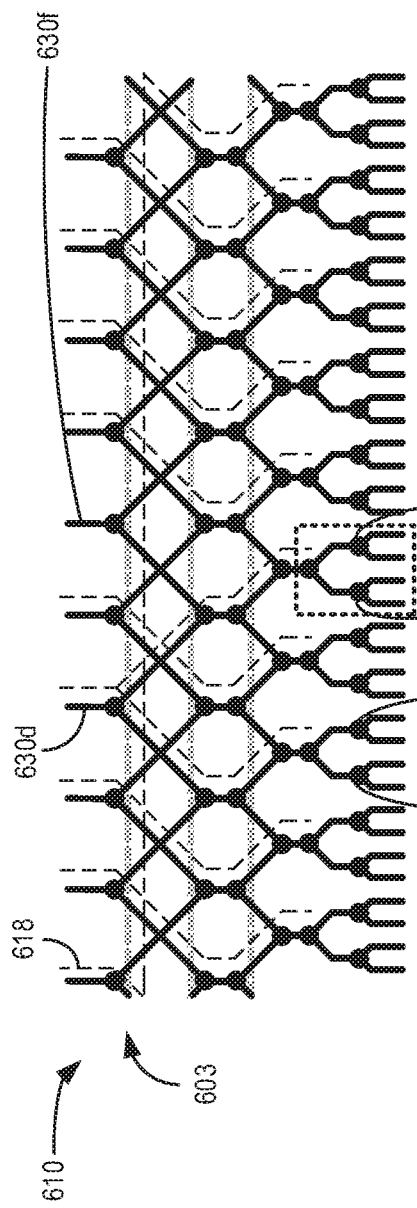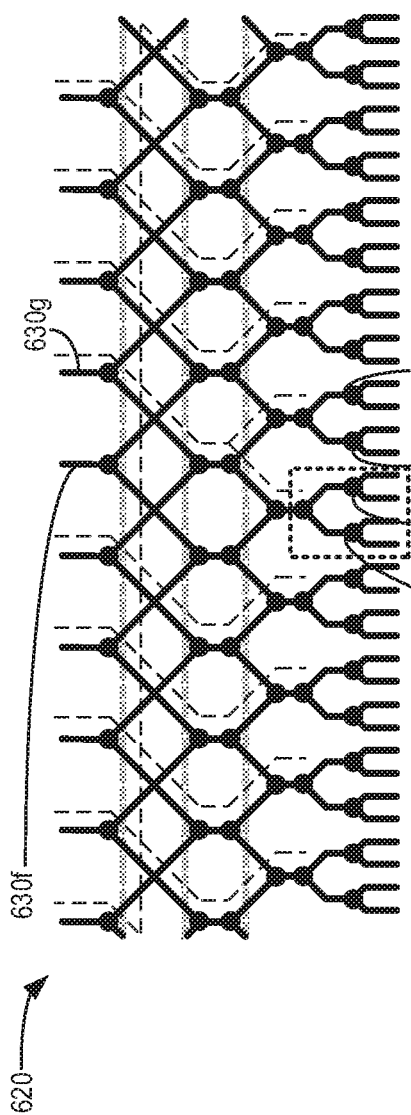
FIG. 6A
FIG. 6B

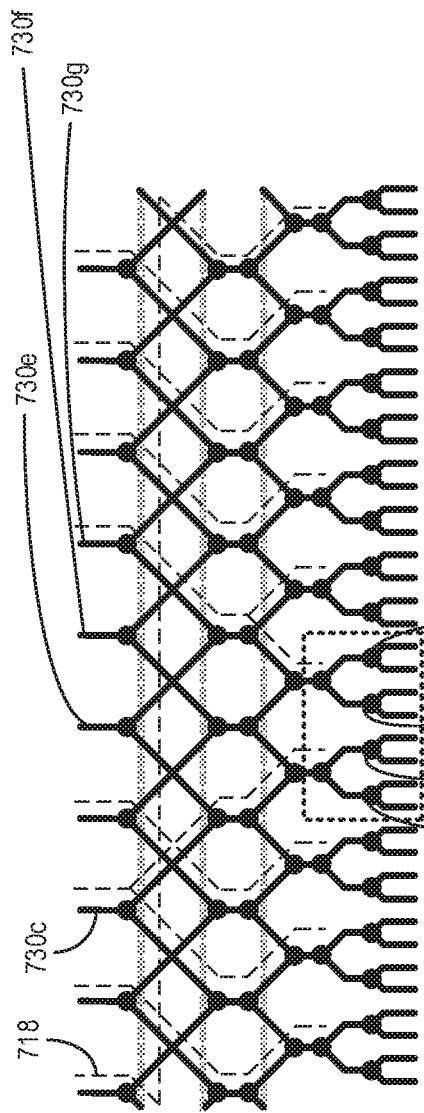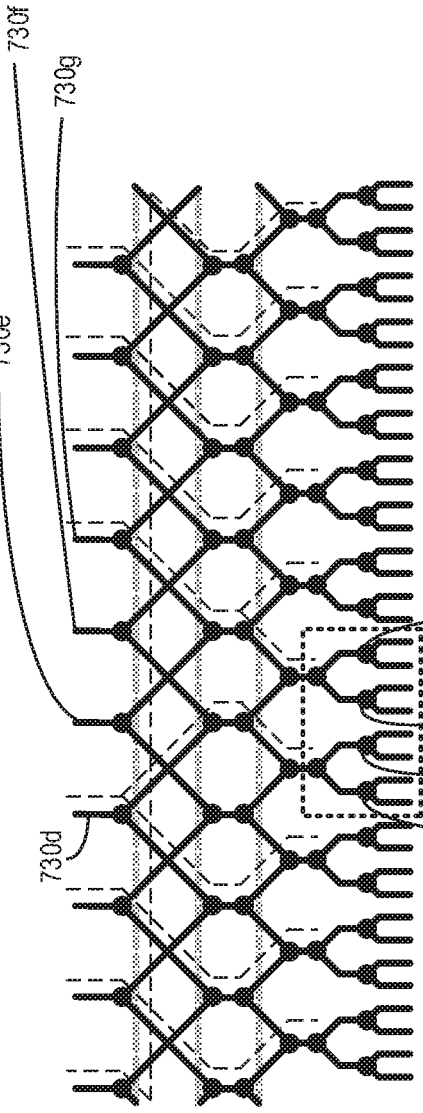
FIG. 7A
FIG. 7B

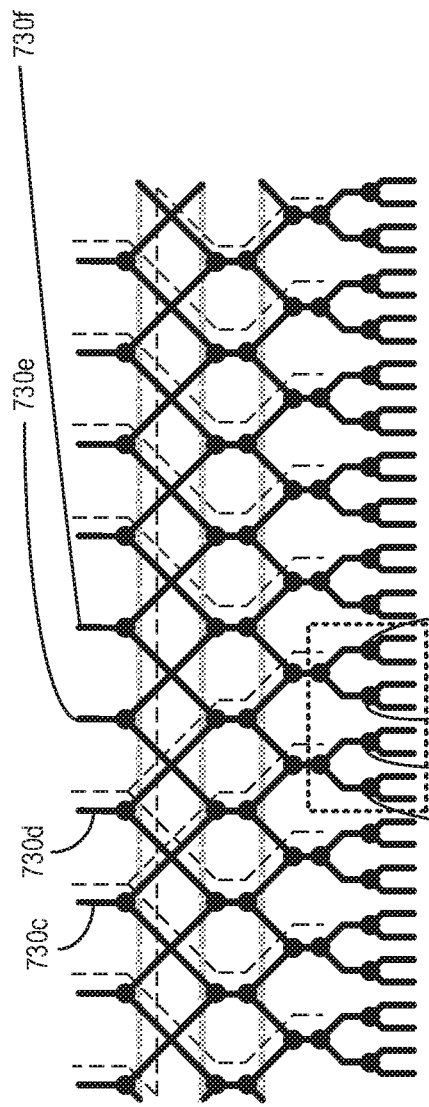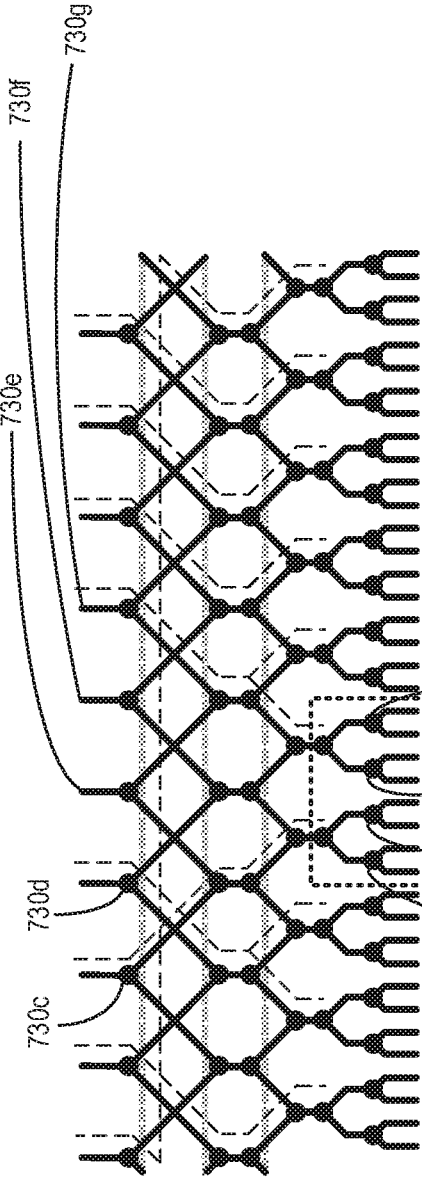

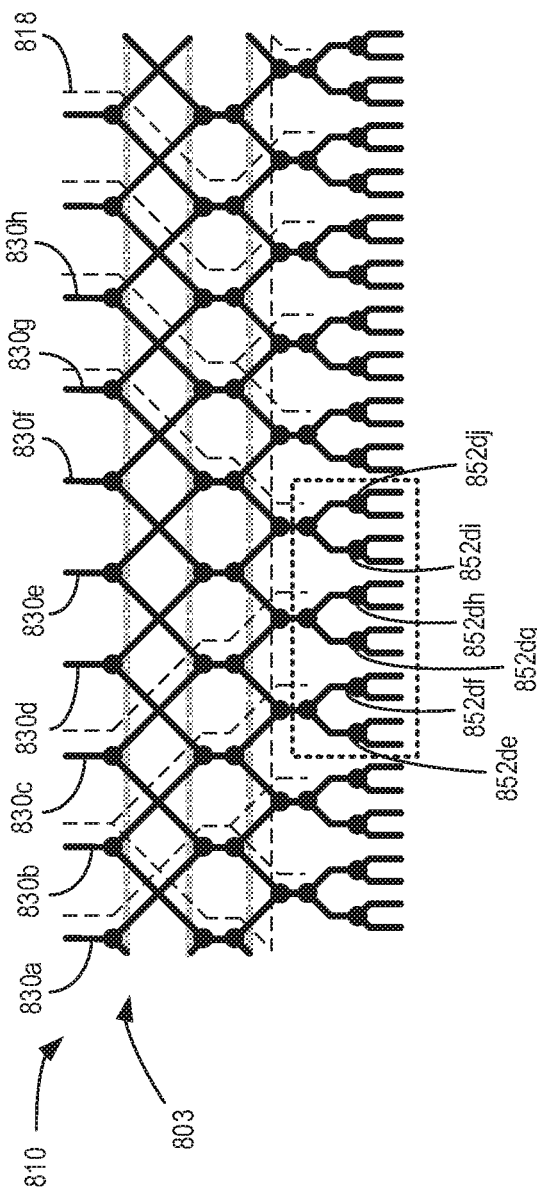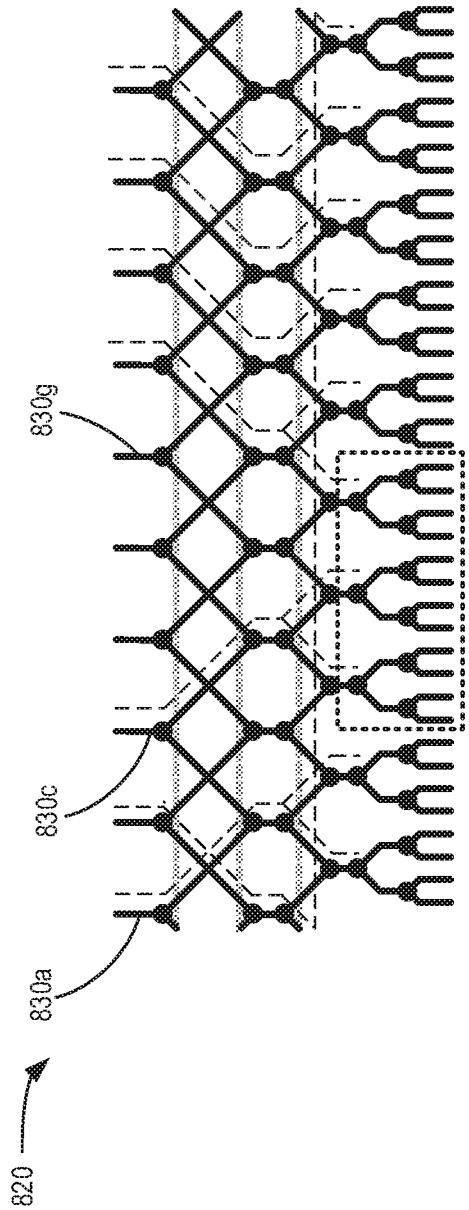
FIG. 8A
FIG. 8B

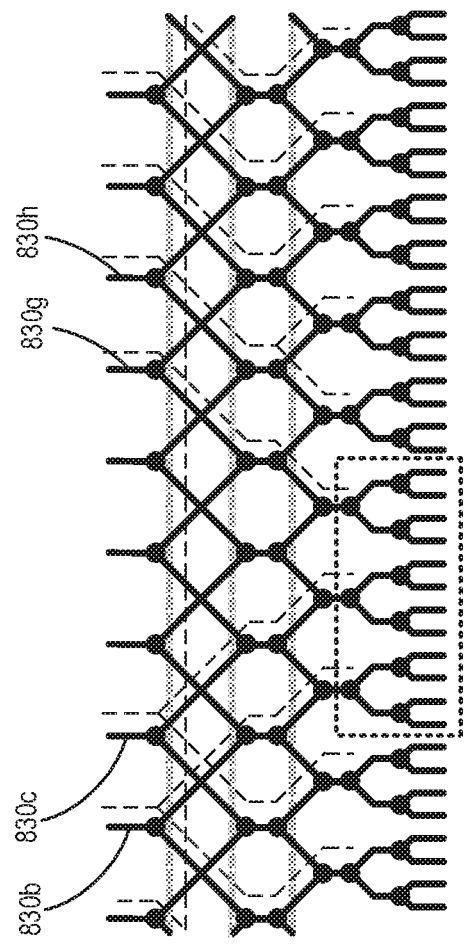
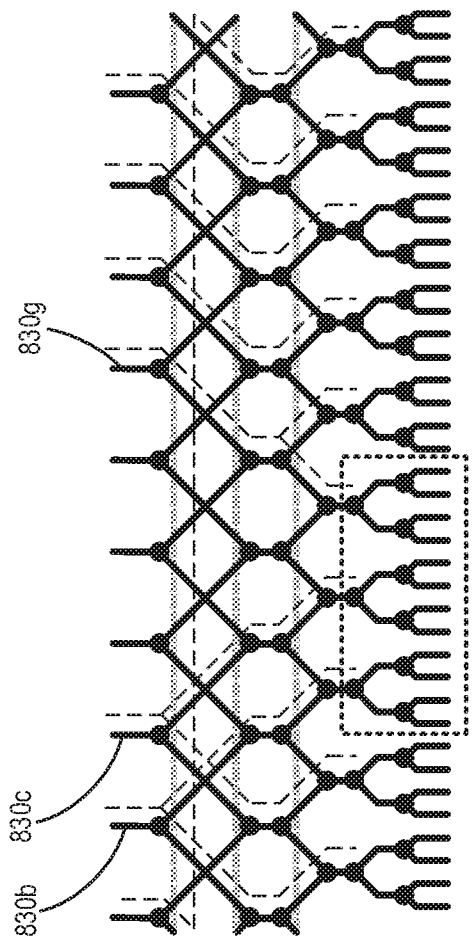

SYSTEMS AND METHODS FOR INCREASING CAPACITY IN A REDUNDANCY NETWORK

CROSS-REFERENCE TO RELATED APPLICATION

This application claims the benefit of U.S. Provisional Application No. 62/405,740 filed Oct. 7, 2016, the entirety of which is hereby incorporated by reference.

FIELD

The described embodiments relate generally to switch network systems, and in particular switch networks systems for systems with redundant components.

BACKGROUND

Many electronic systems can include important operational components that can be prone to failure over the lifetime of the system. Based on the failure rate of the components and other product requirements, spare components may be included in the system. For example, satellite systems may use standby redundancy (i.e. spares) for components that perform critical functions such as transmitters or receivers. These spare components may allow the system to continue to operate, even when one or more components fail.

The additional spare components (e.g. additional transmitters/receivers) provided with a system may be activated when one or more of the initially active components fail. For example, the system can include r spare components at the beginning of life for the system. Thus, a system that is intended to operate with N functional components may include N+r components. This redundant configuration may be referred to as N+r for N redundancy. The number of spares for a particular system can be determined based on operational requirements for high reliability (more spares) and small size, mass, and cost (fewer spares).

As there may be r spare components at the beginning of life, to take advantage of the spare components, the spares may be switched into one of the N communication paths in case of a failure of a component in any of the N communication paths. Accordingly, the initially active components and spare components may be interconnected using a redundancy switch network. However, in typical redundant systems the spare components are not used and lie dormant until the spare components are switched into a communication path (i.e. after the failure of an active component). These spare components consume space and increase the mass of the system.

In some systems, beam hopping switches may be used to distribute the signals from the active components to a number of signal outputs. This may allow the system to effectively share the capacity (such as a data rate capacity in bits per second) provided by each of the N active components (e.g. amplifiers) over a number of outputs (e.g. antennas corresponding to different spot beam locations on earth).

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Various embodiments are described herein that generally relate to switch networks. Some embodiments may include a system comprising a redundancy network and a beam hopping switch network. The redundancy network may be able to communicate signals through a plurality of components, where each component is associated with a different communication path through the redundancy network. The beam hopping switch network may have a plurality of inputs and a plurality of outputs, where the plurality of inputs are coupled to the plurality of inputs and the beam hopping switch network distributes the signals to the plurality of outputs. When a component in the plurality of components fails, the redundancy network and beam hopping switch network can be reconfigured such that the signals that are communicated through the non-failed components are distributed to the plurality of outputs.

Some embodiments may include a signal switching method. The method may include receiving signals through a plurality of components in a redundancy network, where each component in the plurality of components is associated with a different communication path through the redundancy network; receiving the signals through inputs to a beam hopping switch network, where each input is coupled to a component in the plurality of components and the beam hopping switch network routes the signals to a plurality of outputs; and when a component in the plurality of components fails, reconfiguring the redundancy network and beam hopping switch network such that the signals that are communicated through non-failed components are distributed to the plurality of outputs.

In a broad aspect, there is provided a switch network system. The switch network system has a redundancy network with a plurality of redundancy signal transfer paths configured to be communicably coupled to a first plurality of signal components, where the redundancy network includes a plurality of redundancy network signal junctions. The switch network system also has a beam hopping network with a plurality of beam hopping signal transfer paths configured to be communicably coupled to a second plurality of signal components and to a plurality of intermediate signal transfer paths communicably coupled to the redundancy network, where the beam hopping network includes a plurality of beam hopping junctions configurable to define beam hopping signals paths between the intermediate signal transfer paths and the beam hopping signal transfer paths. The plurality of redundancy network signal junctions are configurable to define a plurality of redundancy network signal paths between the redundancy signal transfer paths and the intermediate signal transfer paths so that each redundancy signal transfer path has a different redundancy network signal path communicably coupling that redundancy signal transfer path to a corresponding intermediate signal transfer path; the plurality of beam hopping junctions are dynamically adjustable to reconfigure the beam hopping signals paths between the intermediate signal transfer paths and the beam hopping signal transfer paths so that signals from each redundancy signal transfer path are deliverable to at least two of the beam hopping signal transfer paths; and the plurality of redundancy network signal junctions may be reconfigurable in response to a failure of one of the signal components in the first plurality of signal components to redefine the redundancy network signal paths so that signals from the remaining signal components in the first plurality of signal components are distributable to all of the beam hopping signal transfer paths.

In some embodiments, the plurality of redundancy network signal junctions may include a plurality of first redundancy junctions with each first redundancy junction configured to be communicably coupled to one of the signal components in the first plurality of signal components and a plurality of second redundancy junctions, each second redundancy junction communicably coupled to two of the first redundancy junctions and to one of the intermediate signal transfer paths.

In some embodiments, the plurality of beam hopping junctions may include a plurality of sub-tree junctions arranged into a plurality of beam hopping sub-trees, each beam hopping sub-tree including a first sub-tree junction coupled to a plurality of second sub-tree junctions; and each beam hopping signal path can include the first sub-tree junction and one of the second sub-tree junctions of one of the beam-hopping subtrees.

In some embodiments, each first sub-tree junction can be coupled to at least two of the intermediate signal transfer paths and each downstream sub-tree junction can be coupled to two of the beam hopping signal transfer paths.

In some embodiments, the redundancy network signal junctions and beam hopping signal junctions can be configured to distribute a first signal received from a first signal component in the first plurality of signal components to a first plurality of beam hopping signal transfer paths and to distribute a second signal received from a second signal component in the first plurality of signal components to a second plurality of beam hopping signal transfer paths; and the second plurality of beam hopping signal transfer paths may include a greater number of signal transfer paths than the first plurality of beam hopping signal transfer paths.

In some embodiments, the redundancy network signal junctions are switchable at a first switching rate; the beam hopping junctions are switchable at a second switching rate; and the second switching rate may be at least 10 times faster than the first switching rate. In some embodiments, the second switching rate may be at least 100 times faster than the first switching rate.

In some embodiments, the redundancy network signal junctions have a first reconfiguration time; the beam hopping junctions have a second reconfiguration time; and the second reconfiguration time may be at least 100 times shorter than the first reconfiguration time.

In some embodiments, the system may also include a plurality of redundancy switch controllers coupled to the plurality of redundancy network signal junctions; the plurality of redundancy network signal junctions can include a plurality of redundancy junction pairs, with each redundancy junction pair including one of the first redundancy junctions and one of the second redundancy junctions; and each of the redundancy junction pairs can have a corresponding redundancy pair controller in the plurality of redundancy switch controllers.

In some embodiments, the plurality of redundancy switch controllers can be configured to reconfigure the redundancy network signal junctions only in response to the failure of one of the signal components.

In another broad aspect, there is provided a signal switching method that includes receiving signals from a plurality of signal components; directing the received signals to a plurality of intermediate signal transfer paths through a plurality of redundancy network signal junctions, where the plurality of redundancy network signal junctions define a plurality of redundancy network signal paths between the signal components and the intermediate signal transfer paths with each signal component having a different redundancy network signal paths; routing the signals from the intermediate signal transfer paths to a plurality of beam hopping signal transfer paths through a plurality of beam hopping junctions, the plurality of beam hopping junctions defining beam hopping signal paths between the intermediate signal transfer paths and the beam hopping signal transfer paths; detecting a failure of one of the signal components; and reconfiguring the plurality of redundancy network signal junctions to redefine the redundancy network signal path for at least one of the remaining signal components in response to the detected failure, wherein the redefined redundancy network signal paths enable signals received from the remaining signal components to be distributed to all of the beam hopping signal transfer paths.

In some embodiments, the plurality of beam hopping junctions can be dynamically reconfigurable to adjust the beam hopping signal paths between the intermediate signal transfer paths and the beam hopping signal transfer paths.

In some embodiments, routing the signals from the intermediate signal transfer paths to the plurality of beam hopping signal transfer paths may include routing the signals through a plurality of beam hopping sub-trees, each beam hopping sub-tree having a first sub-tree junction coupled to a plurality of second sub-tree junctions wherein each beam hopping signal path includes the first sub-tree junction and one of the second sub-tree junctions of one of the beam-hopping subtrees.

In some embodiments, the method may also include dynamically adjusting each first sub-tree junction to receive signals from one of at least two intermediate signal transfer paths and each second sub-tree junction to route the received signal to one of two beam hopping signal transfer paths coupled to that second sub-tree junction.

In some embodiments, the method may also include directing a first received signal to a first intermediate signal transfer path communicably connectable to a first plurality of beam hopping signal transfer paths via the beam hopping junctions; and directing a second received signal to a second intermediate signal transfer path communicably connectable to a second plurality of beam hopping signal transfer paths via the beam hopping signal junctions; where the second plurality of beam hopping signal transfer paths includes a greater number of beam hopping signal transfer paths than the first plurality of beam hopping signal transfer paths.

In some embodiments, the method may also include switching the redundancy network signal junctions at a first switching rate; and switching the beam hopping junctions at a second switching rate that is at least 10 times faster than the first switching rate. In some embodiments, the second switching rate may be at least 100 times faster than the first switching rate.

In some embodiments, switching the redundancy network signal junctions may require a first reconfiguration time; switching the redundancy network signal junctions may require a second reconfiguration time; and the second reconfiguration time may be at least 100 times shorter than the first reconfiguration time.

In some embodiments, the method may also include controlling the redundancy network signal junctions using a plurality of redundancy switch controllers; where the plurality of redundancy network signal junctions includes a plurality of redundancy junction pairs, with each redundancy junction pair including one of the first redundancy junctions and one of the second redundancy junctions; and each redundancy junction pairs is controlled by one of the redundancy switch controllers.

In some embodiments, the method may also include reconfiguring the redundancy network signal junctions only in response to the failure of one of the signal components.

These and other aspects and features of various embodiments will be described in greater detail below.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 5A-5D are diagrams illustrating examples of signal paths through a switch network system at the beginning of life in accordance with embodiments described herein;

FIGS. 6A-6B are diagrams illustrating examples of signal paths through a switch network system having one inactive communication path in accordance with embodiments described herein;

FIGS. 7A-7D are diagrams illustrating examples of signal paths through a switch network system having two inactive communication paths in accordance with embodiments described herein;

FIGS. 8A-8D are diagrams illustrating examples of signal paths through a switch network system having three inactive communication paths in accordance with example embodiments described herein;

Figure 1:
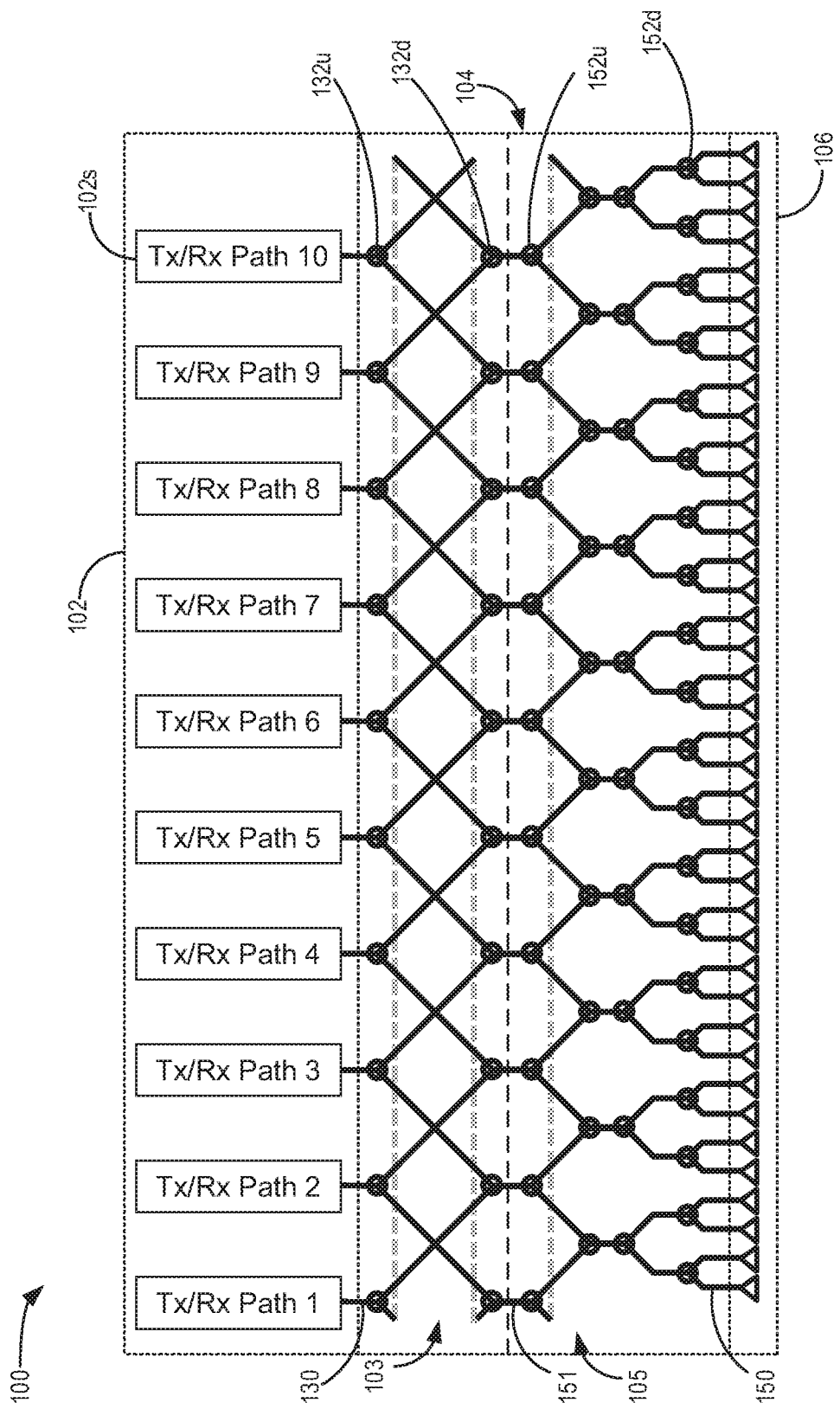
FIG. 1 is a diagram illustrating a switch network system in accordance with an example embodiment.

The drawings, described below, are provided for purposes of illustration, and not of limitation, of the aspects and features of various examples of embodiments described herein. In accordance with common practice, the various described features are not drawn to scale but are drawn to emphasize specific features relevant to the exemplary embodiments. It will be appreciated that for simplicity and clarity of illustration, where considered appropriate, reference numerals may be repeated among the drawings to indicate corresponding or analogous elements or steps.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

In addition, as used herein, the wording "and/or" is intended to represent an inclusive-or. That is, "X and/or Y"

is intended to mean X or Y or both, for example. As a further example, "X, Y, and/or Z" is intended to mean X or Y or Z or any combination thereof.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

Embodiments described herein may provide systems and methods for increasing capacity in a redundancy network. In embodiments described herein, a system may include a combined redundancy network and beam hopping switch network. This may allow the transmit/receive paths through both spare components and active components to be active at the beginning of life of the system. This can provide a redundancy network with increased capacity.

For example, a redundancy network may be configured using an N+r for N redundancy scheme in which r spare components are included. In this example, the ratio of network capacity between embodiments described herein that provide a combined redundancy/beam hopping network to previous redundancy networks can be (N+r)/N at the beginning of life (BOL) for the system. That is, the network capacity in embodiments described herein may be greater than network capacity for redundancy networks that do not use communication paths through spare components at the BOL by a ratio of (N+r)/N.

In embodiments described herein, when a component in a transmit/receive path fails, the network capacity may be decreased with a graceful degradation while full antenna connectivity is retained. For instance, the network capacity may begin at the (N+r)/N ratio and decrease to (N+r−f)/N based on the number of component failures, f. When r components have failed, the capacity of the redundancy network is only then reduced to the same as when N components are used to provide capacity (i.e. to the network capacity of previous redundancy network).

By using the spare components in the communication paths prior to the failure of active components (i.e. before the spares are required for operation of the system), embodiments of the systems described herein can operate with an increased data capacity at the BOL and degrade gracefully as components in the redundancy network fail. Thus, the embodiments described herein may provide increased capacity for the redundancy network until all spare components are required.

Embodiments described herein may provide a switch network system that includes a beam hopping switching network coupled to a redundancy switching network. The combined redundancy and beam hopping network can be configured to permit signals to pass through all available (i.e. all operational/non-failed) components coupled to the redundancy network, including any spare components. This may increase the capacity of the redundancy network, at least at the beginning of system life.

The switch network system may communicably couple a plurality of input signal components to a plurality of output signal components. For example, the switch network system may couple a plurality of transmitters/receivers to a plurality of antenna ports. The switch network system can be configured to define active communication paths through the switch network system (i.e. between the input signal components and output signal components) for each available signal component.

A plurality of signal components can be coupled to the redundancy switch section. In the examples described herein, the signal components coupled to the redundancy switch network may be referred to as input components while the signal components coupled to the beam hopping network may be referred to as output components. However, it should be apparent to a skilled reader that the signal components coupled to the beam hopping network may be input components while the signal components coupled to the redundancy network may be output components.

As well, in some examples herein the direction of signal propagation may be described as flowing from the redundancy network to the beam hopping network. However, a skilled reader will appreciate that signals may propagate in the other direction (i.e. from the beam hopping network to the redundancy network) as well in various implementations.

The input/output components may be any type of component that operates in a communication path, such as a low noise amplifier, a high power amplifier, a transmitter/receiver etc. The plurality of signal components can include one or more spare components that are not required at the beginning of system life to allow for the expected failure of one or more signal components.

The redundancy switching network can include a plurality of upstream input junctions (also referred to as first redundancy junctions) and a plurality of downstream input junctions (also referred to as second redundancy junctions). Each upstream input junction may be coupled to one of the signal components (e.g. via a redundancy signal transfer path) and to a pair of downstream input junctions. Each downstream input junction can be coupled to two of the upstream input junctions and to the beam hopping switch network.

The redundancy junctions (i.e. the junctions in the redundancy switch network) can be configured to define redundancy network signal paths between each of the signal components and the beam hopping network. The redundancy network signal paths (i.e. those currently active and connected) can each be independent of one another, and may not intersect one another. That is, individual switches/junctions in the redundancy network may be configured to provide a redundancy communication path for signals from only one signal component at a given time.

As well, in some embodiments the potential communication paths for each signal component can be limited by the order of junctions (i.e. how many junction levels there are) in the redundancy network. For instance, the switches/junctions in the redundancy network may be configured to communicate signals only in one direction at a given time (e.g. a downstream direction). This may simplify control of the communication paths through the redundancy network.

The beam hopping switch network may include a plurality of branching sub-tree portions. Each sub-tree portion may have an upstream beam hopping junction (also referred to as a first sub-tree junction) coupled to a plurality of downstream junctions (also referred to as second sub-tree junctions) in a branching tree structure. Each upstream beam hopping junction can be coupled to one of the downstream input junctions from the redundancy switching network. The beam hopping switch network can also be coupled to a plurality of output components, such as antenna ports. Each downstream sub-tree junction in the beam hopping switch network can be coupled to two of the output components, e.g. via a beam hopping transfer path.

The beam hopping switch network can be configured to distribute signals received from the redundancy network to a plurality of output components. The switches in the beam hopping switch network may be adjusted so that signals from a particular signal component (after being routed through the redundancy network) are distributed to different output components while the network is in operation.

In some embodiments, the junctions in the switch network system (i.e. the redundancy junction and the beam hopping junctions) may each be configured as 3-port junctions. That is, each junction may be configured with either 1 potential input path and 2 potential output paths or 2 potential input paths and 1 potential output paths. Thus, the junctions in the switch network system may be switched to define the signal paths through the switch network system between the signal inputs and signal outputs. Each active signal path may be independent, and non-overlapping, with all other active signal paths through the switch network system (i.e. each junction can only form part of a single active signal path at a given time).

In some cases, the junctions in the redundancy switch network may be configured as "slow" switches while the junctions in the beam hopping switch network can be configured as "fast" switches. The "fast" switches may have a switching rate that is 10 times faster than the "slow" switches. In some cases, the "fast" switches may have a switching rate that is at least 100 times faster than the "slow" switches.

In some cases, the "fast" switches may have much lower reconfiguration times than the "slow" switches (i.e. the "fast" switches can be reconfigured much faster). For example, the "fast" switches may have a reconfiguration time that is 10 times shorter/less than the "slow" switches. In some cases, the "fast" switches may have a reconfiguration time that is 100 times shatter/less than the "slow" switches.

The "slow" switches may be configured to switch in response to the failure of one or more input components. When an input component fails, the "slow" switches may reconfigure the paths through the redundancy network to ensure that all output ports can be coupled to at least one of the input components through the beam hopping network. The "fast" switches may be configured to share capacity through the output ports between signals received from each of the input ports by dynamically switching to reconfigure the active signal paths through the beam hopping network.

Referring now to FIG. 1, shown therein an example embodiment of a switch network system 100. System 100 includes a combined beam hopping and redundancy switching network 104. The combined switching network 104 is coupled to a first plurality of signal components 102, shown here as input components 102. The combined switching network 104 is also coupled to a second plurality of signal components 106, shown here as a plurality of signal output components 106.

In the example shown in FIG. 1, the output components 106 are antenna ports while the input components 102 are transceivers. In general, however, the signal components 102 and 106 may be any component that is capable of being in a communication path. For example, the components may be low noise amplifiers, high power amplifiers, or other component capable of operating in a communication path.

The switching network 104 can be configured to communicate signals between the components 102 and 106. The switch network 104 includes a redundancy network 103 communicably coupled to a beam hopping network 105. The redundancy network 103 includes a plurality of redundancy signal transfer paths here shown as signal inputs 130. Each signal input 130 can be coupled to one of the signal components 102.

The redundancy network 103 also includes a plurality of redundancy network signal junctions 132. Each redundancy network signal junction 132 may be configured using various switching components, such as circulators, mechanical switches etc. The redundancy network signal junctions 132 are adjustable to define redundancy network signal paths through the redundancy network 103, as discussed in further detail below with reference to FIGS. 5-8.

The beam hopping network 105 includes a plurality of beam hopping signal transfer paths shown here as signal outputs 150 and a plurality of intermediate signal transfer paths or beam hopping inputs 151. Each signal output 150 may be coupled to one of the signal output components 106. Each beam hopping input 151 can be communicably coupled to the redundancy network 103 (i.e. to a downstream junction 132*d*).

The beam hopping network 105 includes a plurality of beam hopping junctions 152. The beam hopping junctions 152 can be configured to define beam hopping signal paths between the beam hopping inputs 151 and the signal outputs 150, as discussed in further detail below with reference to FIGS. 5-8. Thus, in combination, the redundancy network signal junctions 132 and beam hopping junctions 152 are configurable to define active communication paths between the signal components 102 and the signal components 106.

In some embodiments, system 100 may require a minimum number of operable signal components 102. Accordingly, the switch network 104 may be configured to define a minimum number of communication paths between signal components 102 and 106. When system 100 is installed or used at locations that are inaccessible or in situations where redundancy is desired, the system 100 may include one or more spare components 102*s*. The spare components 102*s* may be included in system 100 to permit one or more of the components 102 to fail while maintaining sufficient operating conditions for the desired implementation of system 100.

In previous redundancy networks, when one of the components 102 failed, a spare component 102*s* would be switched into an active path coupled to a component 106. In embodiments described herein, the spare components 102*s* may be coupled to active communication paths at the beginning of system life. Thus, each component 102 may have potential communications paths with a subset of the components 106. When one of the components 102 fails, the communication paths may be reconfigured so that the components 106 that the failed component previously communicated with are redistributed to other, remaining components (see e.g. FIGS. 6-8).

When switching the communication paths, the switching may be performed using mechanical switches, ferrite circulators, or other technology capable of switching signals into different communication paths. In embodiments described herein, the spare components 102*s* may be switched into active communication paths from the beginning of life of the system to provide increased initial capacity. When components fail, the active communication paths can be reconfigured to redistribute signals between the remaining components 102 and the components 106 to continue to provide the required operations. In some embodiments each of the downstream signal components 106 can be communicably coupled to at least one of the upstream signal components 102. In some embodiments, each of the upstream signal components 102 can be communicably coupled to at least two of the downstream signal components 106.

As shown in FIG. 1, the combined switch network 104 can be configured to couple each component 102 to at least two components 106, including the spare components 102s. For example, as shown, the beam hopping network 105 is configurable to couple each beam hopping input 151 to four antenna ports 106. That is, signals from a particular signal component 102, after being directed through the redundancy switching network 103, can then be distributed between at least four antenna ports 106 by adjusting the beam hopping junctions 102. The beam hopping junctions 102 may be configured to rapidly switch the signal from a particular component 102 through the four different antenna ports 106.

At the beginning of life of system 100, each potential communication path (transmit/receive path) and each component 102 can be used to provide capacity through the system 100. The term transmit/receive (Tx/Rx) paths may refer to a transmit or receive path or both and may be used interchangeably with communication paths.

In at least one embodiment, when a component 102 fails, the combined switch network 104 can be reconfigured such that one of the communication paths is coupled to more than four antenna ports 106. In some embodiments, the redundancy network signal junctions 132 may only be reconfigured in response to the failure of a component 102. This may simplify the control of the system 104. This may also allow the redundancy network signal junctions 132 to be implemented using less costly switch technologies, for instance using technologies that switch at much lower rates, because the redundancy network signal junctions 132 may not be required to switch rapidly or often.

As shown in system 100, at the beginning of life, the switch network 104 can be configured to couple each component 102 to four potential antenna ports 106. The beam hopping junctions 152 may then be adjusted to distribute the signals from each component 102 amongst the four potential antenna ports 106 corresponding to that component.

When one of the components 102 fails, the redundancy network signal junctions 132 can be reconfigured such that the antenna ports 106 associated with the failed component 102 are then coupled to another component 102 that is still operational. In some embodiments, one of the components 102 may be coupled to eight different antenna ports 106 when the redundancy network signal paths are reconfigured. Again, the beam hopping junctions 152 may then be adjusted to distribute the signals from each component 102 amongst the potential antenna ports 106 coupled thereto. Examples of system reconfigurations in response to failed components 102 will be discussed in further detail below with reference to FIGS. 6-8.

In some embodiments, the switch network 104 may be dynamically reconfigured such that the antenna ports 106 associated with the failed component 102 can be switched and coupled to different functioning components 102 from time to time. Thus, regardless of the number of failed components, the components 102 that are coupled to eight different antenna ports 106 may be adjusted from time to time by reconfiguring the redundancy network junctions 132 and upstream beam hopping junctions 152u.

In some systems, different antenna ports 106 may have associated operational requirements that change over time. For example, the antenna ports may be associated with particular geographic locations that may require increased capacity at certain times of the day. Thus, when a location needs increased capacity, the antenna port 106 associated with that particular location may be coupled to a component 102 that is coupled to only four separate antenna ports. However, when the location does not need increased capacity, the antenna port 106 associated with that particular location may be coupled to a component 102 that is coupled to eight separate antenna ports 106. Thus, the switch network 104 may increase the capacity of the system 100 while still providing the desired redundancy.

Table 1 below illustrates an example of network capacity that may be provided by embodiments described herein for different switch network configurations. Table 1 illustrates an example of the effective increase in initial network capacity as compared to redundancy networks in which the spare components are initially unused.

TABLE 1

Increased Network Capacity at BOL

| Tx/Rx Path Effective Redundancy | BOL Tx/Rx Paths | Minimum EOL Tx/Rx Paths | Antenna Ports | Beam Hopping Ratios BOL | Beam Hopping Ratios EOL | Effective Increase in BOL Network Capacity |
|---|---|---|---|---|---|---|
| 5 for 4 | 5 | 4 | 10 | 1:2 | 1:2, 1:4 | 25% |
| 5 for 4 | 5 | 4 | 20 | 1:4 | 1:4, 1:8 | 25% |
| 6 for 5 | 6 | 5 | 24 | 1:4 | 1:4, 1:8 | 20% |
| 12 for 10 | 12 | 10 | 32 | 1:4 | 1:2, 1:4 | 20% |
| 10 for 7 | 10 | 7 | 20 | 1:2 | 1:2, 1:4 | 43% |
| 10 for 7 | 10 | 7 | 40 | 1:4 | 1:4, 1:8 | 43% |

As shown in Table 1, a system implemented with a 5 for 4 redundancy (i.e., a system with four required components and one additional component) at the BOL, there are five potential Tx/Rx paths through the components and four required minimum end of life (EOL) Tx/Rx paths. In embodiments where the switch network system couples the components to 10 antenna ports (as shown in the first row), the system can be configured to provide a beam hopping ratio for each component of 1:2 at the BOL. When a component has failed, the switch network system (in particular the redundancy network) can be reconfigured such that the other components in the system have a beam hopping ratio at the EOL of either 1:2 (for three of the remaining components at any given time) or 1:4 (for one of the remaining components at any given time). This can provide an effective increase in BOL network capacity of about 25 percent over the EOL network capacity.

In embodiments where the switch network system couples the components to 20 antenna ports (as shown in the second row), there is a beam hopping ratio for each component of 1:4 at the BOL. When a component has failed, the switch network system (in particular the redundancy network) can be reconfigured such that the other components in the system have a beam hopping ratio at the EOL of either 1:4 (for 3 of the components at any given time) or 1:8 (for 1 of the remaining components at any given time). This can provide an effective increase in BOL network capacity of about 25 percent over the EOL network capacity.

In further embodiments, a switch network system may be implemented with Tx/Rx Path Effective Redundancy of 6 for 5, where there are 5 necessary components and one additional component as shown in the third row. In such embodiments, there are 6 BOL Tx/Rx paths through the components and 5 minimum end of life (EOL) Tx/Rx paths. In such embodiments where the switch network system couples the components to 24 antenna ports, the system can be configured to provide a beam hopping ratio for each component of 1:4 at BOL and reconfigured to provide a beam hopping ratio at the EOL of either 1:4 or 1:8 for each Tx/Rx component. This can provide an effective increase in BOL network capacity over the EOL network capacity of about 20 percent.

In embodiments implemented with a Tx/Rx Path Effective Redundancy of 12 for 10, there are ten necessary components and two spare components, such that there are twelve BOL Tx/Rx paths through the components and ten minimum end of life (EOL) Tx/Rx paths. In such embodiments where the switch network system couples the components to 32 antenna ports (as shown in the fourth row), the system can be configured to provide a beam hopping ratio for each component of either 1:2 or 1:4 at BOL and a beam hopping ratio at the EOL of either 1:2 or 1:4 for each component. This can provide an effective increase in BOL network capacity over the EOL network capacity of about 20 percent.

In further embodiments, such as those shown in the fifth and sixth rows of Table 1, systems may be implemented with a Tx/Rx Path Effective Redundancy of 10 for 7. In such embodiments, the system may include seven necessary or required components and three spare components. The system can be configured to provide ten active BOL Tx/Rx paths through the components and seven active end of life (EOL) Tx/Rx paths. In embodiments where the switch network system couples the components to 20 antenna ports, the system can be configured to provide a beam hopping ratio for each component at BOL of 1:2 and a beam hopping ratio at the EOL of either 1:2 or 1:4. This can provide an effective increase in BOL network capacity over the EOL network capacity of about 43 percent (see the fifth row of Table 1).

In embodiments where the switch network system couples the components to 40 antenna ports, the system can be configured to provide a beam hopping ratio for each component at the BOL of 1:4 and a beam hopping ratio at the EOL of either 1:4 or 1:8. This can provide an effective increase in BOL network capacity over the EOL network capacity of about 43 percent.

Figure 2A:
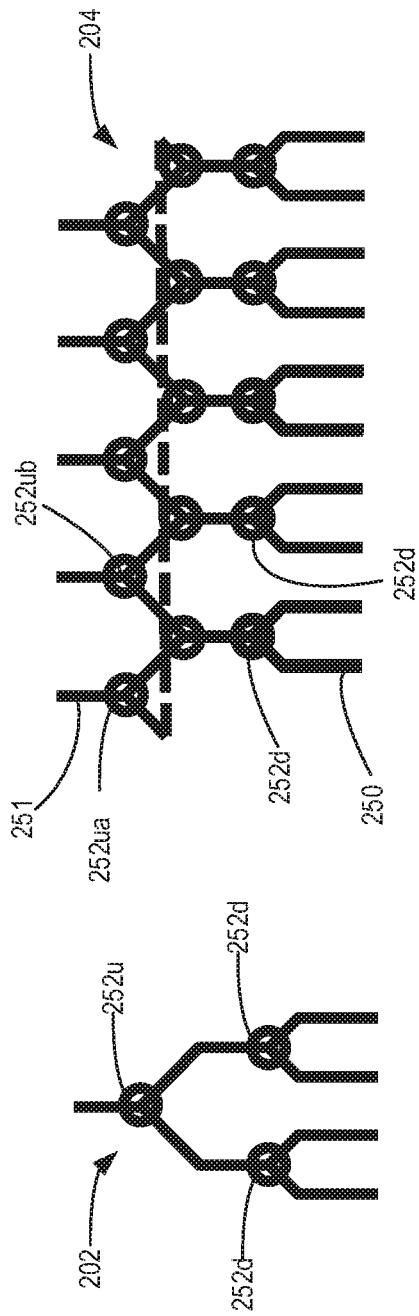
FIG. 2A is a diagram illustrating an example beam hopping sub-tree and corresponding beam hopping network in accordance with an embodiment.
Figure 2B:
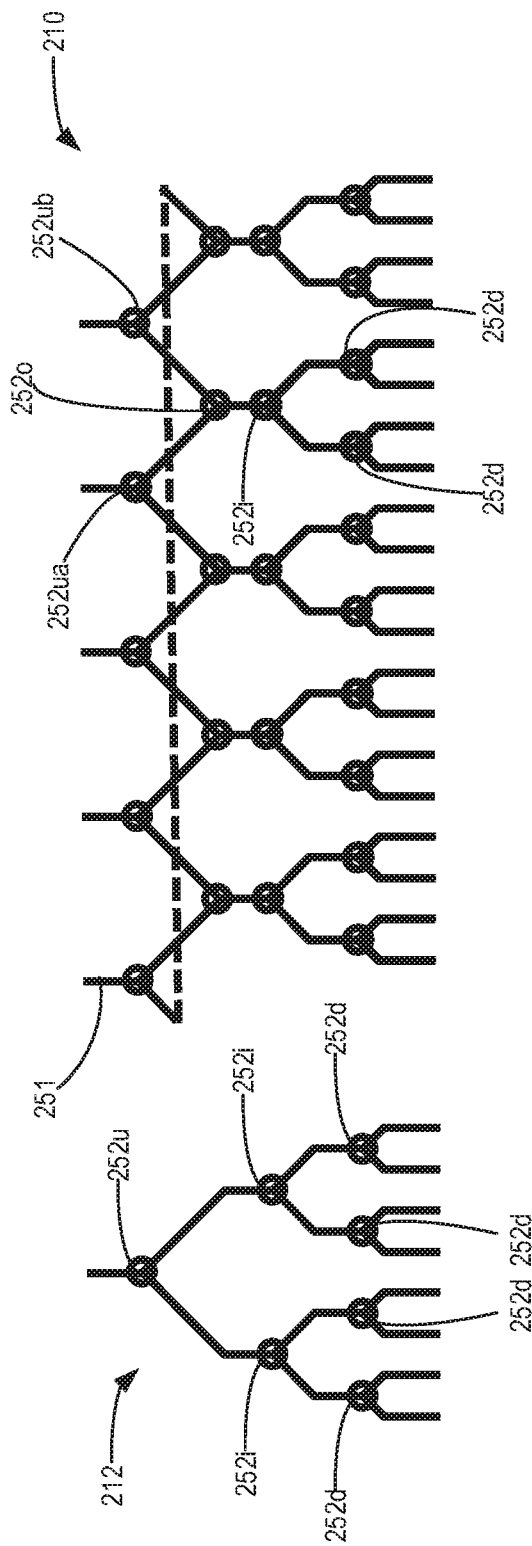
FIG. 2B is a diagram illustrating another example beam hopping sub-tree and corresponding beam hopping network in accordance with an embodiment.

Referring now to FIGS. 2A and 2B, shown therein are example embodiments of beam hopping sub-tree portions 202 and 212 and corresponding beam hopping networks 204 and 210 implemented using the beam hopping sub-tree portions 202 and 212 respectively. The example beam hopping networks 204 and 210 may be used in embodiments of system 100 to provide the beam hopping network 105.

The beam hopping junctions 152 in beam hopping network 105 may include a plurality of sub-tree junctions 152 arranged into a plurality of beam hopping sub-trees such as sub-trees 202 and 212 shown in FIGS. 2A and 2B respectively. Each beam hopping sub-tree 202/212 includes an upstream sub-tree junction 252u coupled to a plurality of downstream sub-tree junctions 252d. The beam hopping junctions 252 can be configured to define beam hopping signal paths between the beam hopping inputs 251 (or intermediate signal transfer paths) and the beam hopping outputs 250 (or beam hopping signal transfer paths). Each beam hopping signal path can include the upstream sub-tree junction 252u and one of the downstream sub-tree junctions 252d of one of the beam-hopping subtrees 202/212. The beam hopping signal path can also include one or more intermediate sub-tree junctions 252 between the upstream sub-tree junction 252u and the downstream sub-tree junction 252d.

In some cases, the beam flopping sub-tree 212 may include a plurality of tree junction levels. In cases where there are at least three tree junction levels, the beam hopping sub-tree 212 may also include a plurality of intermediate sub-tree junctions 252i between the upstream sub-tree junction 252u and the downstream sub-tree junction 252d.

The order of a beam-hopping sub-tree 202/212 can be defined based on the number of tree junction levels. For instance, beam-hopping sub-tree 202 includes two beam-hopping junction levels and may be referred to as a second order beam-hopping sub-tree. On the other hand, beam-hopping sub-tree 212 includes three beam hopping junction levels and may be referred to as a third order beam-hopping sub-tree.

The order of a particular beam-hopping sub-tree may constrain the number of potential beam hopping signal paths from a particular upstream sub-tree junction 252u to the plurality of downstream sub-tree junctions 252d. As shown in FIG. 2A, the beam hopping network 204 may be configured to provide beam hopping signal paths between each upstream sub-tree junction 252u and two of the downstream sub-tree junctions 252d. In FIG. 2B, the beam hopping network 210 may be configured to provide beam hopping signal paths between each upstream sub-tree junction 252u and three of the downstream sub-tree junctions 252d, via intermediate sub-tree junctions 252i.

FIGS. 2A and 2B illustrate examples of how beam hopping network 105 may be formed using beam-hopping building blocks in the form of beam hopping sub-trees 202 and 212 respectively. For example, FIG. 2A illustrates the formation of a beam hopping switch network 202 that provides 1:2 beam hopping connectivity for five beam hopping inputs 251. The beam hopping network 204 may be configured to provide 5 for 4 redundancy. As shown, the beam hopping network 204 is fabricated from 1×4 switch network building blocks 202 that are overlapped.

FIG. 26 illustrates the formation of a 1:4 beam hopping network 210 with 5 inputs 251 that can be configured to provide 5 for 4 redundancy. The beam hopping network 210 is assembled using 1×5 switch network building blocks 212.

The beam hopping networks shown in FIGS. 2A and 2B may be used in switch network systems that may provide full connectivity with up to one inactive input component 102. More generally, switch networks configured to couple a range of N+1 to N inputs to M outputs may be assembled from 1×P building blocks with N+1 copies repeated every P/2 outputs. For example, in FIG. 2A, the number of required components N=4, the number of available output components M=10, and the number of beam hopping signal transfer paths coupled to each upstream junction 252u P=4. Accordingly, beam hopping network 204 is assembled using 5 copies of 1×4 building blocks that are repeated every other output.

In FIG. 2B, N=4, M=20, and P=8. Accordingly, there are 5 copies of 1×8 building blocks that repeat every fourth output. In certain implementations, the connectivity of the beam-hopping sub-trees can be wrapped around as the left ports are coupled to the right ports. That is, the beam-hopping sub-trees can be continually overlapped to provide a continuous switch network. Alternatively, instead of wrapping the connectivity around from left to right, further inputs may be provided. This may facilitate the mechanical constructions. However, the addition of further inputs may bring about a loss of efficiency. When all of the inputs are active, the switch network offers 1:P/2 beam hopping. When 1 input becomes inactive, the beam hopping switch network offers a mix of 1:P/2 and 1:P beam hopping for signals received from the inputs.

Figure 3A:
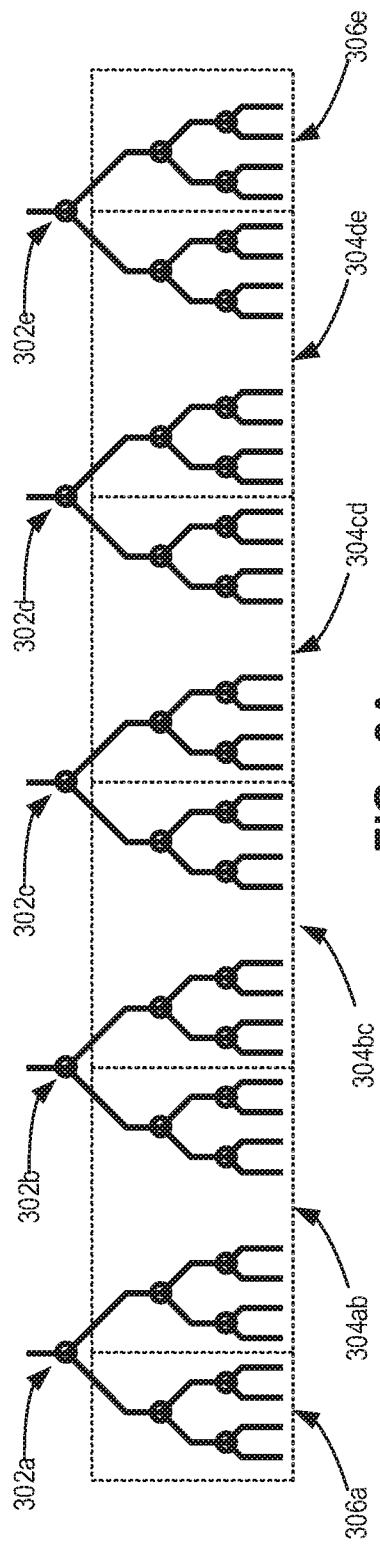
FIG. 3A is a diagram illustrating a plurality of beam hopping sub-trees in accordance with an example embodiment.
Figure 3B:
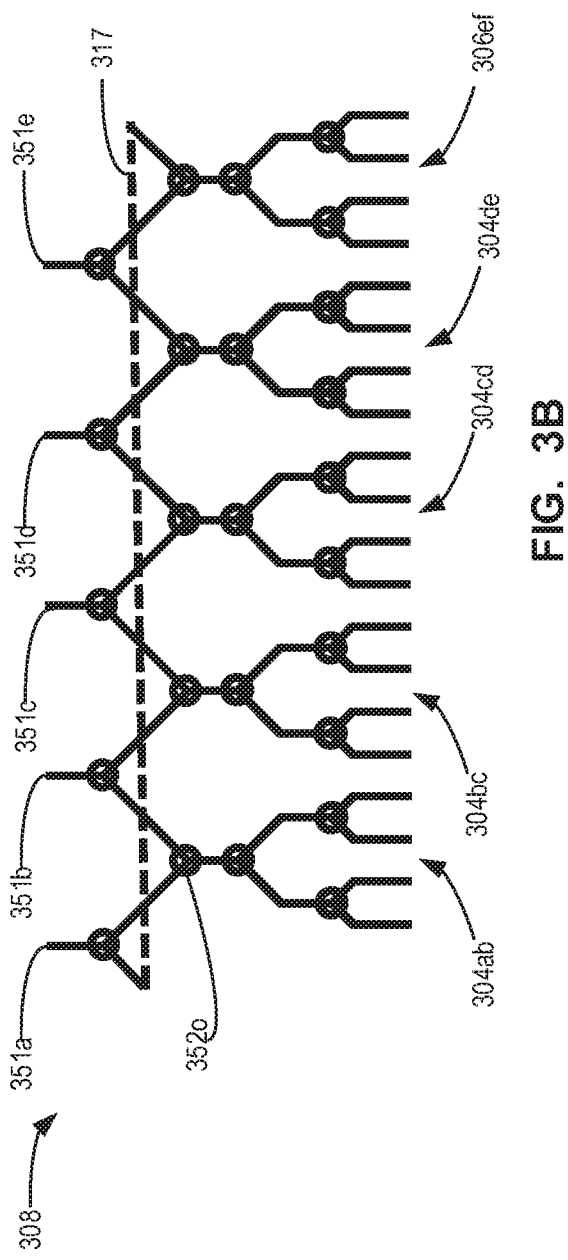
FIG. 3B is a diagram illustrating a beam hopping network using the plurality of beam hopping sub-trees shown in FIG. 3A in accordance with an example embodiment.

Referring now to FIGS. 3A and 3B, illustrated therein is an example of how sub-tree building blocks 302a-302e can be assembled to form a beam hopping network 308. As illustrated, the building blocks 302 are 1×8 building blocks, in which each beam hopping input 351 can be coupled to 8 output components via beam hopping sub-tree junctions 352. To combine the different building blocks 302, adjacent sub-tree sections shown grouped as 304 and 306 are overlapped.

For instance, where sub-tree portions 302a and 302b overlap in sub-tree section 304ab an additional switch 352o is included in beam hopping network 308. Additional junction 352o can be configured to control the junction between overlapping sub-tree portions 302a and 302b. The switch 352o can be adjusted to control which beam hopping input 351a or 351b is coupled to the sub-tree section 304ab. Further, the beam hopping network connectivity wraps around to increase the usage of the Tx/Rx paths as represented by portions 306. This is shown by potential communication path section 317.

Figure 4A:
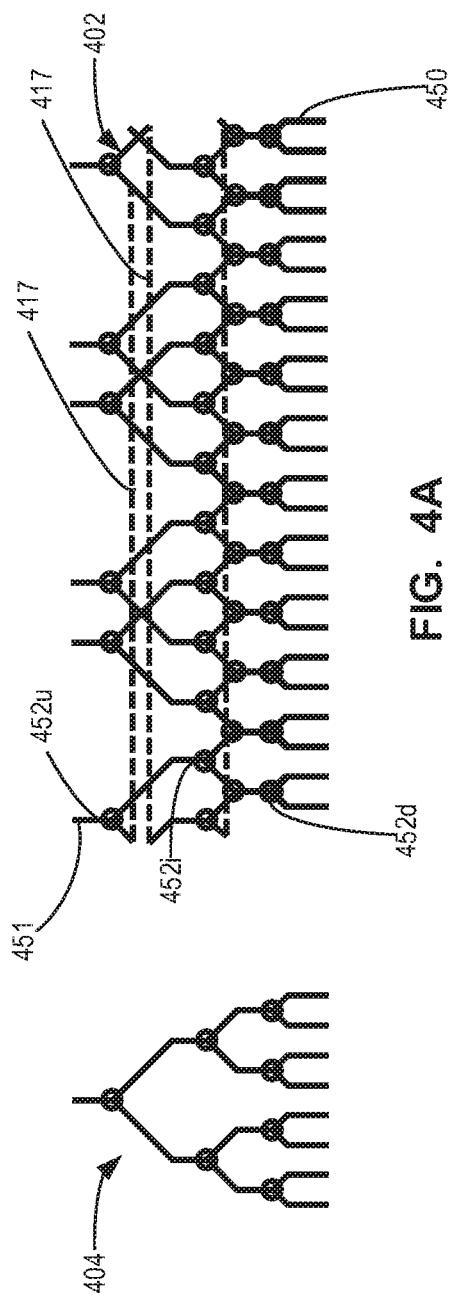
FIGS. 4A-4E are diagrams illustrating examples of beam hopping sub-trees and corresponding beam hopping networks in accordance with embodiments described herein.

FIG. 4A illustrates another example embodiment of a beam hopping network 402. Beam hopping network 402 includes a plurality of sub-tree junctions 452 coupling intermediate signal transfer paths 451 to beam hopping signal transfer paths 450. Beam hopping network 402 may be configured to provide full connectivity between the beam hopping inputs 451 and the signal outputs 450 with up to 1 inactive input. For example, beam hopping network 402 may be arranged using a 1×8 beam hopping sub-tree building block 404.

More generally, in embodiments of systems configured to couple a range of N+1 to N input components with connectivity to M output components, the beam hopping network may be arranged using 1×P beam hopping sub-tree building blocks with N+1 copies of each building block repeated an average of P/2 outputs, such as alternating between P/4 and 3P/4, where N+1 is a positive, even integer. When all the input components are active, each input can be individually beam hopped between P/2 outputs (i.e. the beam hopping junctions can be dynamically adjusted to direct the signal from each input component to P/2 output components). When there is 1 inactive input, the different inputs can be separately beam hopped between either P/2 and P outputs.

As described above with reference to FIGS. 3A-3B, connectivity can wrap around from the left side to the right side as shown by potential communication path section 417. Alternatively, additional inputs may be added allowing for a slight loss of efficiency. For example, as shown in FIG. 4A, P=8 (i.e. the number of outputs from each beam hopping sub-tree building block) and N=5 (i.e. the number of required active inputs is 5), thus N+1=6 (i.e. the number of available input components at BOL is 6, thus there is one additional component).

The building blocks 404 repeat on average of P/2 or every 4 outputs as P=8. However, in beam hopping network 404 the budding blocks 404 do not repeat every 4 outputs. Rather, the sub-tree building blocks 404 may alternatingly repeat every 2 outputs and every 6 outputs, for an average of every 4 outputs. When all the inputs are active, the beam hopping junctions 452 can be configured to distribute signals from the beam hopping inputs 451 between 4 outputs 450. Further, when there is one input inactive, the beam hopping junctions 452 can be configured to distribute signals from the beam hopping inputs 451 between either 4 outputs or 8 outputs.

Figure 4B:
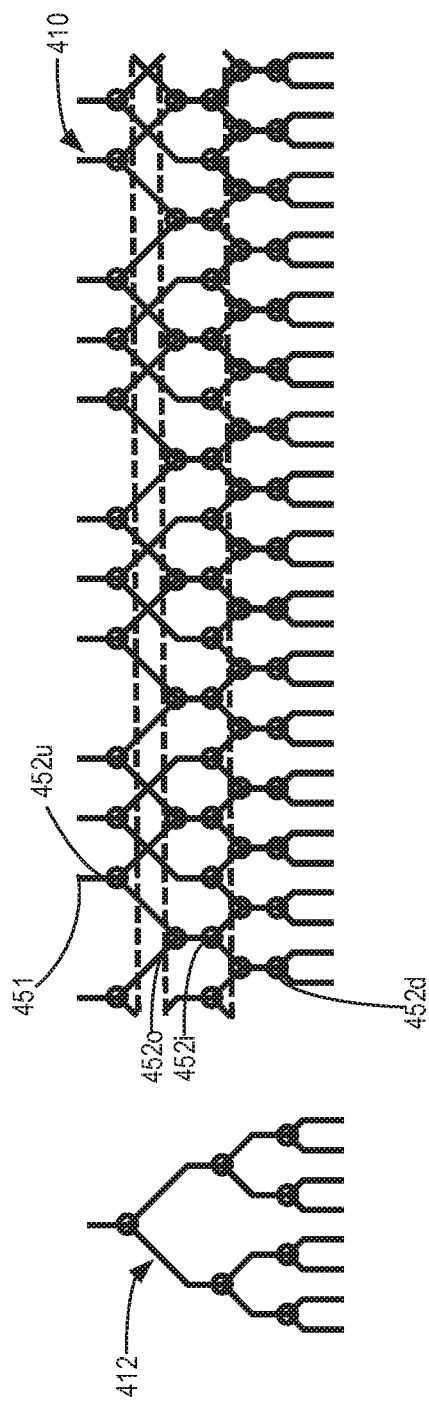

FIG. 4B illustrates an example embodiment of a beam hopping network 410 configured to provide full connectivity with up to 2 inactive input components. Beam hopping network 410 may be arranged using a plurality of 1×8 beam hopping sub-tree building blocks 412.

More generally, in embodiments of systems configured to couple a range of N+2 to N inputs with connectivity to M outputs, the beam hopping network may be arranged using 1×P beam hopping sub-tree budding blocks with N+2 copies of each building block repeated an average of P/3 outputs, such as a repeating pattern of P/4, P/4, and P/2 outputs. When all input components are active, the beam hopping junctions 452 can be dynamically adjusted to direct signals from each input component to either P/2 or P/4 output components. When there is 1 inactive input component or 2 inactive input components, the different inputs can be separately beam hopped between either P/2 and P/4 outputs.

As described above, connectivity can wrap around from the left side to the right side or additional inputs may be added. For example in FIG. 4B, P=8 and N=10, thus N+2=12. The twelve sub-tree building blocks 412 are repeated in a pattern of 4 output ports, 2 output ports, 2 output ports and illustrate a beam hopping network 410 configured to provide a combination of 1:4 and 1:2 beam hopping. When there are twelve active output ports, the beam hopping network 410 can be configured to operate as eight 1:2 beam hopping sub-trees and four 1:4 beam hopping sub-trees. When there are eleven active output ports, the beam hopping network 410 can be configured to operate as six 1:2 beam hopping sub-trees and five 1:4 beam hopping sub-trees. When there are ten active output ports, the beam hopping network 410 can be configured to operate as four 1:2 beam hopping sub-trees and six 1:4 beam hopping sub-trees.

Figure 4C:
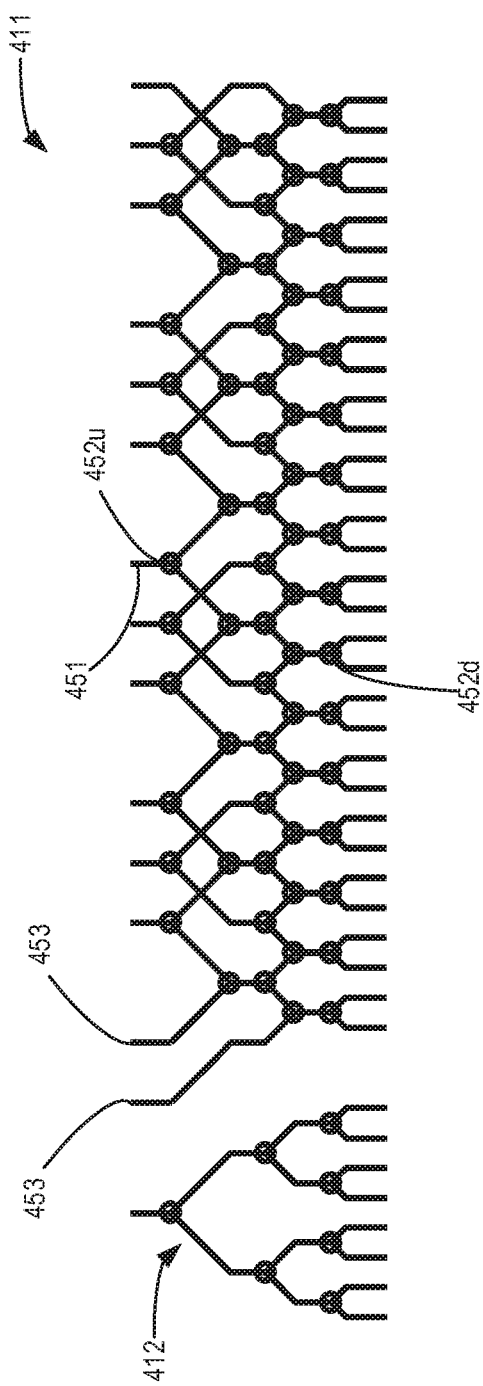

FIG. 4C illustrates a beam hopping network 411 in which additional beam hopping inputs 453 are included rather than providing edge-wrapped/continuous connectivity as shown in FIGS. 4A and 4B above. Beam hopping network 411 is similar to beam hopping network 410 with the exception that the beam hopping network 411 includes two additional inputs 453 that remove the need to connect the opposing ends of the beam hopping network 411. This may simplify the mechanical layout of the switch network. In contrast, beam hopping network 410 requires two fewer input ports, which may reduce the size of the beam hopping network.

Figure 4D:
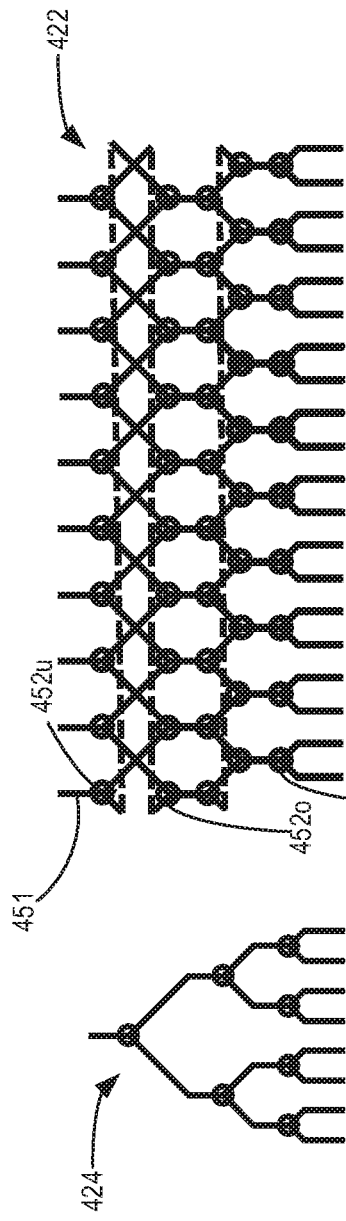

FIG. 4D illustrates another implementation of a beam hopping network 422 that that can be configured to provide full connectivity with up to 3 inactive inputs. Beam hopping network 422 can be constructed by arranging a plurality of 1×8 beam hopping sub-tree building block 424.

More generally, in embodiments of systems configured to couple a range of N+3 to N input components with connectivity to M output components, the beam hopping network may be arranged using 1×P beam hopping sub-tree building blocks with N+3 copies of each building block repeated every P/4 outputs. When all the input components are active, the beam hopping junctions 452 can be dynamically adjusted to direct the signal from each beam hopping between P/4 outputs (that is, each input can be individually beam hopped between P/4 outputs by adjusting the corresponding beam hopping junctions 452).

When there is 1 inactive input, the input components can be separately beam hopped between either P/2 and P/4 outputs. As described above, connectivity can wrap around from the left side to the right side (as shown in FIGS. 4A and 4B) or additional inputs may be added with a loss of efficiency (as shown in FIG. 4C). In the example shown in FIG. 4D, P=8 and N=7, thus N+3=10.

The beam hopping sub-tree building blocks 424 can be repeated every P/4 or every two outputs as P=8. When there is one inactive input, eight of the inputs can be beam hopped between P/4 or two outputs and one input can be beam hopped between P/2 or four outputs. When there are two inactive inputs, six of the inputs can be beam hopped between P/4 or two outputs and two inputs can be beam hopped between P/2 or four outputs. When there are three inactive inputs, four of the inputs can be beam hopped between P/4 or two outputs and three inputs can be beam hopped between P/2 or four outputs.

Figure 4E:
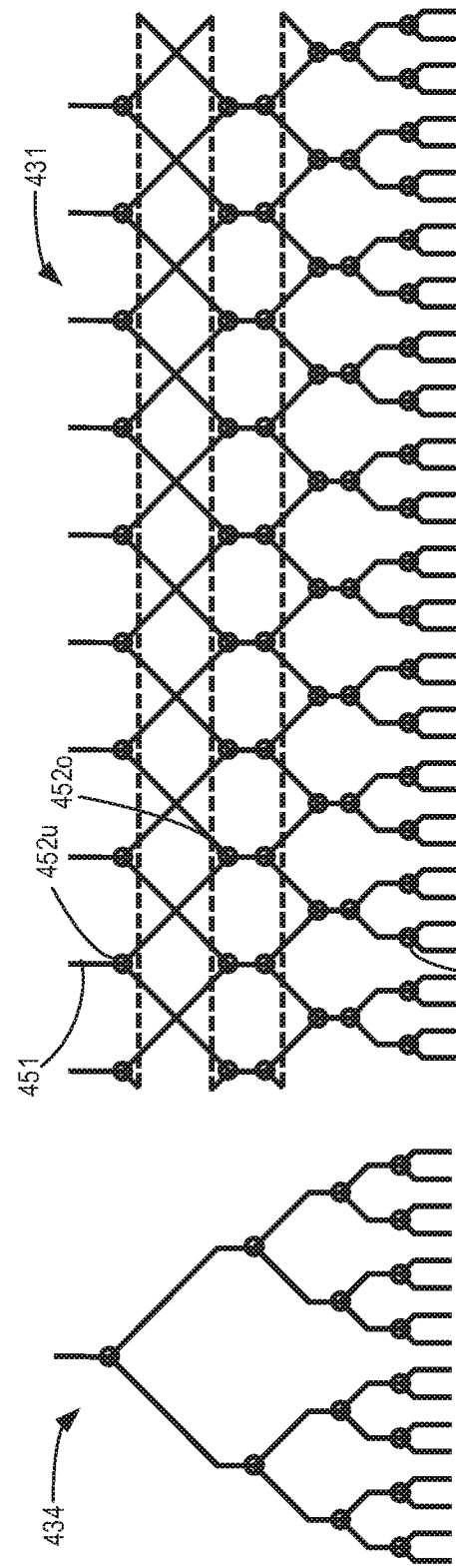

FIG. 4E illustrates another example of a beam hopping network 431. Beam hopping network 431 may be configured to provide full connectivity with up to 3 inactive inputs. As shown in FIG. 4E, beam hopping network 431 may be assembled by arranging a plurality of 1×16 beam hopping sub-tree building blocks 434.

In embodiments of systems configured to couple a range of N+3 to N input components with connectivity to M output components, the beam hopping network may be arranged using 1×P beam hopping sub-tree building blocks with N+3 copies of each building block repeated every P/4 outputs. When all the input components are active, the inputs can be individually beam hopped between P/4 outputs.

When there is 1 inactive input, the different inputs can be separately beam hopped between either P/2 or P/4 outputs. As described above, connectivity can wrap around from the left side to the right side or additional inputs could be added with a loss of efficiency. For example in FIG. 4E, P=16 and N=7, thus N+3=10. The building blocks 434 repeat every four outputs (i.e. P/4) because P=16. When there is one inactive input, eight of the inputs can be beam hopped between P/4 (i.e. four outputs) and one input can be beam hopped between P/2 (i.e. eight outputs). When there are two inactive inputs, six of the inputs can be beam hopped between P/4 (i.e. four outputs) and two inputs can be beam hopped between P/2 (i.e. eight outputs). When there are three inactive inputs, four of the inputs can be beam hopped between P/4 (i.e. four outputs) and three inputs can be beam hopped between P/2 (i.e. eight outputs).

FIGS. 5A-5D illustrate examples of the communication paths (518a-518j) through a switch network at the beginning of life of a redundancy network connected to the beam hopping switch network 431 of FIG. 4E. FIGS. 5A-5D illustrate 4 example configurations of the redundancy network 503, with the redundancy network signal paths 518 illustrated at the beginning of life in a system using a 10 to 40 beam hopping network 505.

Each input 530 has sixteen corresponding potential outputs 506 to which that input 530 could be coupled. However, when all ten input components are active, the switch network system 510 can be configured to couple each input 530 to four of those outputs 506. In FIG. 5A, the redundancy network signal paths 518 are defined by the redundancy junctions 532 (and upstream beam hopping junctions 552u) so that each input component 530 is coupled to the four left-most possible output components 506 corresponding to that input component 530. Signals from each input component 530 may then be directed between those corresponding output components 506 by adjusting the beam hopping junctions 552. For instance, input component 530c is coupled to intermediate beam hopping junction 552ia. The signals from input component 530c may be distributed between four outputs 506 by dynamically adjusting the intermediate beam hopping junction 552ia and downstream beam hopping junctions 552da and 552db.

In FIG. 5B, the redundancy network signal paths 520 are defined so each input is coupled to the four middle-left possible output components corresponding to that input component. For instance, input component 530c is coupled to intermediate beam hopping junction 552ib. The signals from input component 530c may be distributed between four outputs 506 by dynamically adjusting the intermediate beam hopping junction 552ib and downstream beam hopping junctions 552dc and 552dd.

In FIG. 5C, the redundancy network signal paths 518 are defined so each input is coupled to the four middle-right possible output components corresponding to that input component. For instance, input component 530c is coupled to intermediate beam hopping junction 552ic. The signals from input component 530c may be distributed between four outputs 506 by dynamically adjusting the intermediate beam hopping junction 552ic and downstream beam hopping junctions 552de and 552df.

In FIG. 5D, the redundancy network signal paths 540 are defined so that each input component is coupled to the four right-most possible output components corresponding to that input component. For instance, input component 530c is coupled to intermediate beam hopping junction 552id. The signals from input component 530c may be distributed between four outputs 506 by dynamically adjusting the intermediate beam hopping junction 552id and downstream beam hopping junctions 552dg and 552dh.

Tables 2 and 3, shown below, illustrate possible communication paths through the switch network system 525 over time when the redundancy network is configured using the redundancy network signal paths 518 shown in FIG. 5C.

TABLE 2

Coordinated Sequential Switching

| Time | Antenna Port Schedule for Transmit/Receive Path | | | | | | | | | |
|---|---|---|---|---|---|---|---|---|---|---|
| Slot | Path 1 | Path 2 | Path 3 | Path 4 | Path 5 | Path 6 | Path 7 | Path 8 | Path 9 | Path 10 |
| 0 | 1 | 5 | 9 | 13 | 17 | 21 | 25 | 29 | 33 | 37 |
| 1 | 2 | 6 | 10 | 14 | 18 | 22 | 26 | 30 | 34 | 38 |
| 2 | 3 | 7 | 11 | 15 | 19 | 23 | 27 | 31 | 35 | 39 |
| 3 | 4 | 8 | 12 | 16 | 20 | 24 | 28 | 32 | 36 | 40 |
| 4 | 1 | 5 | 9 | 13 | 17 | 21 | 25 | 29 | 33 | 37 |

TABLE 2-continued

Coordinated Sequential Switching

| Time Slot | Antenna Port Schedule for Transmit/Receive Path ||||||||||
|---|---|---|---|---|---|---|---|---|---|
| | Path 1 | Path 2 | Path 3 | Path 4 | Path 5 | Path 6 | Path 7 | Path 8 | Path 9 | Path 10 |
| 5 | 2 | 6 | 10 | 14 | 18 | 22 | 26 | 30 | 34 | 38 |
| 6 | 3 | 7 | 11 | 15 | 19 | 23 | 27 | 31 | 35 | 39 |
| 7 | 4 | 8 | 12 | 16 | 20 | 24 | 28 | 32 | 36 | 40 |
| 8 | 1 | 5 | 9 | 13 | 17 | 21 | 25 | 29 | 33 | 37 |
| 9 | 2 | 6 | 10 | 14 | 18 | 22 | 26 | 30 | 34 | 38 |
| 10 | 3 | 7 | 11 | 15 | 19 | 23 | 27 | 31 | 35 | 39 |
| 11 | 4 | 8 | 12 | 16 | 20 | 24 | 28 | 32 | 36 | 40 |
| 12 | 1 | 5 | 9 | 13 | 17 | 21 | 25 | 29 | 33 | 37 |
| 13 | 2 | 6 | 10 | 14 | 18 | 22 | 26 | 30 | 34 | 38 |
| 14 | 3 | 7 | 11 | 15 | 19 | 23 | 27 | 31 | 35 | 39 |
| 15 | 4 | 8 | 12 | 16 | 20 | 24 | 28 | 32 | 36 | 40 |

In Table 2, the communication paths 518 are switched by adjusting the beam hopping signal paths sequentially from left to right. For example, the beam hopping network 505 switches path 1 (corresponding to communication path 518a) incrementally from corresponding output components 1-4 (from left to right) with each time slot and each of the other paths 518 are switched in a similar manner.

TABLE 3

Independent Switching

| Time Slot | Antenna Port Schedule for Transmit/Receive Path ||||||||||
|---|---|---|---|---|---|---|---|---|---|
| | Path 1 | Path 2 | Path 3 | Path 4 | Path 5 | Path 6 | Path 7 | Path 8 | Path 9 | Path 10 |
| 0 | 1 | 5 | 12 | 16 | 17 | 21 | 28 | 32 | 33 | 37 |
| 1 | 2 | 5 | 11 | 14 | 18 | 21 | 27 | 30 | 34 | 37 |
| 2 | 3 | 5 | 10 | 14 | 19 | 21 | 26 | 30 | 35 | 37 |
| 3 | 4 | 5 | 9 | 13 | 20 | 21 | 25 | 29 | 36 | 37 |
| 4 | 1 | 6 | 12 | 16 | 17 | 22 | 28 | 32 | 33 | 38 |
| 5 | 2 | 6 | 11 | 14 | 18 | 22 | 27 | 30 | 34 | 38 |
| 6 | 3 | 6 | 10 | 15 | 19 | 22 | 26 | 31 | 35 | 38 |
| 7 | 4 | 6 | 9 | 15 | 20 | 22 | 25 | 31 | 36 | 38 |
| 8 | 1 | 7 | 12 | 16 | 17 | 23 | 28 | 32 | 33 | 39 |
| 9 | 2 | 7 | 11 | 14 | 18 | 23 | 27 | 30 | 34 | 39 |
| 10 | 3 | 7 | 10 | 15 | 19 | 23 | 26 | 31 | 35 | 39 |
| 11 | 4 | 7 | 9 | 15 | 20 | 23 | 25 | 31 | 36 | 39 |
| 12 | 1 | 8 | 12 | 16 | 17 | 24 | 28 | 32 | 33 | 40 |
| 13 | 2 | 8 | 11 | 14 | 18 | 24 | 27 | 30 | 34 | 40 |
| 14 | 3 | 8 | 10 | 15 | 19 | 24 | 26 | 31 | 35 | 40 |
| 15 | 4 | 8 | 9 | 15 | 20 | 24 | 25 | 31 | 36 | 40 |

Table 3 illustrates an example of communication paths 518 that may be provided when the beam hopping network 505 adjusts the beam hopping signal paths for the various beam hopping inputs 551 differently from one another. For example, path 1 (corresponding to communication path 518a) is switched in a similar manner as path 1 was switched in Table 2. However, path 2 (corresponding to communication path 518b) is switched every fourth time slot, path 3 (corresponding to communication path 518c) is switched in reverse order, path 4 (corresponding to communication path 518d) is switched in randomly.

FIGS. 6A and 6B are diagrams of possible paths 618 through a switch network system using the beam hopping network 431 of FIG. 4E coupled to a redundancy network 603 that has experienced a failure in one component 630f such that there is an inactive input. When one Tx/Rx path fails, leaving 9 active Tx/Rx paths, the switch network 610 can operate as eight 1:4 hopping switch sections and one 1:8 hopping switch section. Either of two Tx/Rx paths 630d or 630g may be routed to the 1:4 hopping switch section in the failed path without changing the connectivity of the remaining paths. Many other configurations may also be provided by also changing the connectivity of the remaining paths.

Connection to the 1:4 hopping switch section in the failure path may be alternated between the two possible Tx/Rx paths to provide the equivalent of seven 1:4 hopping switch sections and two 1:6 switch sections in terms of switching rate or capacity per beam. As shown in FIG. 6A, when the beginning of life paths are configured as described above with reference to FIG. 5B and the component 630f in path 6 fails, the signals from path 4 (i.e. from component 630d) can be switched between eight different outputs (i.e. outputs downstream from beam hopping junctions 652de, 652df, 652di and 652dj). Alternatively, as shown in FIG. 6B, the signals from path 7 (i.e. from component 630g) may also be switched between eight different outputs (outputs downstream from beam hopping junctions 652di, 652dj, 652dk, 652dl) that include the outputs associated with path 6 (the outputs downstream from beam hopping junctions 652di and 652dj).

Tables 4 and 5 illustrate possible communication paths 618 versus time through the switch network systems 610/620 with one inactive component 630f shown in FIGS. 6A and 6B.

TABLE 4

Component 7 Coupled to 8 Possible Outputs

Time | Antenna Port Schedule for Transmit/Receive Path
| Slot | Path 1 | Path 2 | Path 3 | Path 4 | Path 5 | Path 6 | Path 7 | Path 8 | Path 9 | Path 10 |
|---|---|---|---|---|---|---|---|---|---|---|
| 0  | 37 | 1 | 5 | 9  | 13 | n/a | 17 | 25 | 29 | 33 |
| 1  | 38 | 2 | 8 | 10 | 14 | n/a | 18 | 26 | 30 | 34 |
| 2  | 39 | 3 | 7 | 11 | 15 | n/a | 19 | 27 | 31 | 35 |
| 3  | 40 | 4 | 8 | 12 | 16 | n/a | 20 | 28 | 32 | 36 |
| 4  | 37 | 1 | 5 | 9  | 13 | n/a | 21 | 25 | 29 | 33 |
| 5  | 38 | 2 | 6 | 10 | 14 | n/a | 22 | 26 | 30 | 34 |
| 6  | 39 | 3 | 7 | 11 | 15 | n/a | 23 | 27 | 31 | 35 |
| 7  | 40 | 4 | 8 | 12 | 16 | n/a | 24 | 28 | 32 | 36 |
| 8  | 37 | 1 | 5 | 9  | 13 | n/a | 17 | 25 | 29 | 33 |
| 9  | 38 | 2 | 6 | 10 | 14 | n/a | 18 | 26 | 30 | 34 |
| 10 | 39 | 3 | 7 | 11 | 15 | n/a | 19 | 27 | 31 | 35 |
| 11 | 40 | 4 | 8 | 12 | 16 | n/a | 20 | 28 | 32 | 36 |
| 12 | 37 | 1 | 5 | 9  | 13 | n/a | 21 | 25 | 29 | 33 |
| 13 | 38 | 2 | 6 | 10 | 14 | n/a | 22 | 26 | 30 | 34 |
| 14 | 39 | 3 | 7 | 11 | 15 | n/a | 23 | 27 | 31 | 35 |
| 15 | 40 | 4 | 8 | 12 | 16 | n/a | 24 | 28 | 32 | 36 |

As shown in Table 4, the signals from path 7 (i.e. from component 630g) can be directed between eight possible output components. Because the component 630f associated with path 6 is inactive, the signals from path 7 (i.e. from component 630g) can be directed between possible outputs 17-24 by adjusting the beam hopping switch sections associated with path 7. The signals from the remaining paths can be directed through 4 possible outputs as described above with references to FIGS. 5A-5D and Tables 2-3.

TABLE 5

Output Sharing

Time | Antenna Port Schedule for Transmit/Receive Path
| Slot | Path 1 | Path 2 | Path 3 | Path 4 | Path 5 | Path 6 | Path 7 | Path 8 | Path 9 | Path 10 |
|---|---|---|---|---|---|---|---|---|---|---|
| 0  | 37 | 1 | 5 | 9  | 13 | n/a | 17 | 25 | 29 | 33 |
| 1  | 38 | 2 | 6 | 10 | 14 | n/a | 18 | 26 | 30 | 34 |
| 2  | 39 | 3 | 7 | 11 | 15 | n/a | 19 | 27 | 31 | 35 |
| 3  | 40 | 4 | 8 | 12 | 16 | n/a | 20 | 28 | 32 | 36 |
| 4  | 37 | 1 | 5 | 9  | 13 | n/a | 21 | 25 | 29 | 33 |
| 5  | 38 | 2 | 6 | 10 | 14 | n/a | 22 | 26 | 30 | 34 |
| 6  | 39 | 3 | 7 | 11 | 15 | n/a | 23 | 27 | 31 | 35 |
| 7  | 40 | 4 | 8 | 12 | 16 | n/a | 24 | 28 | 32 | 36 |
| 8  | 37 | 1 | 5 | 17 | 13 | n/a | 21 | 25 | 29 | 33 |
| 9  | 38 | 2 | 6 | 18 | 14 | n/a | 22 | 26 | 30 | 34 |
| 10 | 39 | 3 | 7 | 19 | 15 | n/a | 23 | 27 | 31 | 35 |
| 11 | 40 | 4 | 8 | 20 | 16 | n/a | 24 | 28 | 32 | 36 |
| 12 | 37 | 1 | 5 | 9  | 13 | n/a | 21 | 25 | 29 | 33 |
| 13 | 38 | 2 | 6 | 10 | 14 | n/a | 22 | 26 | 30 | 34 |
| 14 | 39 | 3 | 7 | 11 | 15 | n/a | 23 | 27 | 31 | 35 |
| 15 | 40 | 4 | 8 | 12 | 16 | n/a | 24 | 28 | 32 | 36 |

Table 5 illustrates examples of communication paths that may result when the signal components 630d and 630g associated with path 4 and path 7 can both be coupled to the outputs previously associated with the now inactive component through path 6.

FIGS. 7A-7D are diagrams of possible paths 718 through a switch network system using the beam hopping network 431 of FIG. 4E coupled to a redundancy network 703 that has experienced failures in two components 730e and 730f such that there are two inactive inputs. In the example shown, when two Tx/Rx paths fail, there are eight active Tx/Rx paths and the switch network system 710 can operate as six 1:4 hopping switch sections and two 1:8 hopping switch sections.

Any of three Tx/Rx paths 730c, 730d, 730g may be routed to the 1:4 hopping switch sections (that include downstream beam hopping junctions 752dg, 752dh, 752di, 752dj) in the failed paths. Connection to the 1:4 hopping switch sections in either of the two failure paths may be made as part of a 1:8 switch grouping or as a dedicated 1:4 hopping switch connection. Connection to either failed path may also be alternated between 1:8 and 1:4 configurations in multiple possible Tx/Rx paths to provide the equivalent of four 1:4 hopping switch sections and four 1:6 switch sections in terms of switching rate or capacity per beam. FIGS. 7A-7D show four examples of possible Tx/Rx paths 718 when two failures have occurred in the components 730e and 730f coupled to redundancy network 703.

Table 6 illustrates illustrate possible communication paths 718 versus time through a switch network system with two inactive components 730e and 730f. In the example shown in Table 6, the components 730d and 730g associated with redundancy path 4 and path 7 each switch over eight different output components (those downstream from beam hopping junctions 752dg, 752dh, 752di, 752dj).

TABLE 6

Two Inactive Components

| Time Slot | Antenna Port Schedule for Transmit/Receive Path | | | | | | | | | |
|---|---|---|---|---|---|---|---|---|---|---|
| | Path 1 | Path 2 | Path 3 | Path 4 | Path 5 | Path 6 | Path 7 | Path 8 | Path 9 | Path 10 |
| 0 | 37 | 1 | 13 | 5 | n/a | n/a | 17 | 25 | 29 | 33 |
| 1 | 38 | 2 | 14 | 6 | n/a | n/a | 18 | 26 | 30 | 34 |
| 2 | 39 | 3 | 15 | 7 | n/a | n/a | 19 | 27 | 31 | 35 |
| 3 | 40 | 4 | 16 | 8 | n/a | n/a | 20 | 28 | 32 | 36 |
| 4 | 37 | 1 | 13 | 9 | n/a | n/a | 21 | 25 | 29 | 33 |
| 5 | 38 | 2 | 14 | 10 | n/a | n/a | 22 | 26 | 30 | 34 |
| 6 | 39 | 3 | 15 | 11 | n/a | n/a | 23 | 27 | 31 | 35 |
| 7 | 40 | 4 | 16 | 12 | n/a | n/a | 24 | 28 | 32 | 36 |
| 8 | 37 | 1 | 13 | 5 | n/a | n/a | 17 | 25 | 29 | 33 |
| 9 | 38 | 2 | 14 | 6 | n/a | n/a | 18 | 26 | 30 | 34 |
| 10 | 39 | 3 | 15 | 7 | n/a | n/a | 19 | 27 | 31 | 35 |
| 11 | 40 | 4 | 16 | 8 | n/a | n/a | 20 | 28 | 32 | 36 |
| 12 | 37 | 1 | 13 | 9 | n/a | n/a | 21 | 25 | 29 | 33 |
| 13 | 38 | 2 | 14 | 10 | n/a | n/a | 22 | 26 | 30 | 34 |
| 14 | 39 | 3 | 15 | 11 | n/a | n/a | 23 | 27 | 31 | 35 |
| 15 | 40 | 4 | 16 | 12 | n/a | n/a | 24 | 28 | 32 | 36 |

In the example of Table 6, both the components 730*e* and 730*f* corresponding to path 5 and path 6 are inactive. The beam hopping switches associated with path 7 (i.e. component 730*g*) switch between outputs 17-24, and the beam hopping switches associated with path 4 switch between outputs 5-12, and the other beam hopping switches associated with the other active paths switch between four outputs.

FIGS. 8A-8D are diagrams of possible paths 818 through a switch network system using the beam hopping network 431 of FIG. 4E coupled to a redundancy network 803 that has experienced a failure in three components 830*d*, 830*e* and 830*f* such that there are three inactive inputs. When three Tx/Rx paths fail, there are seven active Tx/Rx paths (830*a*, 830*b*, 830*c*, 830*g*, 830*h*, 830*i*, and 830*j*), the network 810 can be configured to operate as four 1:4 hopping switch sections and three 1:8 hopping switch sections.

Either of two Tx/Rx paths may be routed to the 1:4 hopping switch sections in the third failed path. Connection to the 1:4 hopping switch sections in the three failure paths may be alternated between multiple possible Tx/Rx paths to allocate the switching rate or capacity per beam in multiple combinations. FIGS. 8A-8D show four examples of possible Tx/Rx paths 818 when three failures have occurred in the redundancy network 803.

The 24 antenna ports fed by 1:8 beam hopping and 16 antenna ports fed by 1:4 beam hopping are flexible even after multiple failures. Locations that were previously serviced by a now failed Tx/Rx path (those downstream of beam hopping junctions 852*de*-852*dj*) can still be configured as 1:4 beam hopping sections if desired.

Table 7 illustrates possible communication paths 818 versus time through a switch network system with three inactive components.

TABLE 7

Three Inactive Components

| Time Slot | Antenna Port Schedule for Transmit/Receive Path | | | | | | | | | |
|---|---|---|---|---|---|---|---|---|---|---|
| | Path 1 | Path 2 | Path 3 | Path 4 | Path 5 | Path 6 | Path 7 | Path 8 | Path 9 | Path 10 |
| 0 | 1 | 37 | 9 | n/a | n/a | n/a | 17 | 25 | 29 | 33 |
| 1 | 2 | 38 | 10 | n/a | n/a | n/a | 18 | 26 | 30 | 34 |
| 2 | 3 | 39 | 11 | n/a | n/a | n/a | 19 | 27 | 31 | 35 |
| 3 | 4 | 40 | 12 | n/a | n/a | n/a | 20 | 28 | 32 | 36 |
| 4 | 5 | 37 | 13 | n/a | n/a | n/a | 21 | 25 | 29 | 33 |
| 5 | 6 | 38 | 14 | n/a | n/a | n/a | 22 | 26 | 30 | 34 |
| 6 | 7 | 39 | 15 | n/a | n/a | n/a | 23 | 27 | 31 | 35 |
| 7 | 8 | 40 | 16 | n/a | n/a | n/a | 24 | 28 | 32 | 36 |
| 8 | 1 | 37 | 9 | n/a | n/a | n/a | 17 | 25 | 29 | 33 |
| 9 | 2 | 38 | 10 | n/a | n/a | n/a | 18 | 26 | 30 | 34 |
| 10 | 3 | 39 | 11 | n/a | n/a | n/a | 19 | 27 | 31 | 35 |
| 11 | 4 | 40 | 12 | n/a | n/a | n/a | 20 | 28 | 32 | 36 |
| 12 | 5 | 37 | 13 | n/a | n/a | n/a | 21 | 25 | 29 | 33 |
| 13 | 6 | 38 | 14 | n/a | n/a | n/a | 22 | 26 | 30 | 34 |
| 14 | 7 | 39 | 15 | n/a | n/a | n/a | 23 | 27 | 31 | 35 |
| 15 | 8 | 40 | 16 | n/a | n/a | n/a | 24 | 28 | 32 | 36 |

In the example of Table 7, components 730*d*-730*f* in paths 4-6 are inactive. Accordingly, the signals from components 730*a*, 730*c* and 730*g* in redundancy paths 1, 3, and 7 each switch over eight different outputs. The beam hopping switch section associated with path 1 switches between outputs 1-8, the beam hopping switch section associated with path 3 switches between outputs 9-16, the beam hopping switch section associated with path 7 switches between outputs 17-24, and the other beam hopping switch section associated with the other redundancy paths switch between four outputs.

In embodiments described herein above, various reconfiguration options are available for a given location of failed Tx/Rx paths/signal components. In some cases, the reconfiguration of a switch network system may be constrained so that signals from a particular component may only be beam hopped between adjacent output components. That is, the beam hopping switches that are dynamically reconfigurable may be constrained such that signals may only be beam-hopping within a beam hopping sub-tree. Accordingly, in some embodiments, only the sub-tree junctions may be dynamically reconfigurable.

For instance, a switch network system can be constrained such that "fast" 1×8 beam hopping occurs when a signal is beam hopped between eight adjacent ports. Accordingly, the switch network system may be implemented using "slow" switching junctions. The "slow" switches may be configured to only switch once following any Tx/Rx path failure. In other words, the "slow switches" may be configured to switch only in response to the failure of a signal component.

Figure 9:
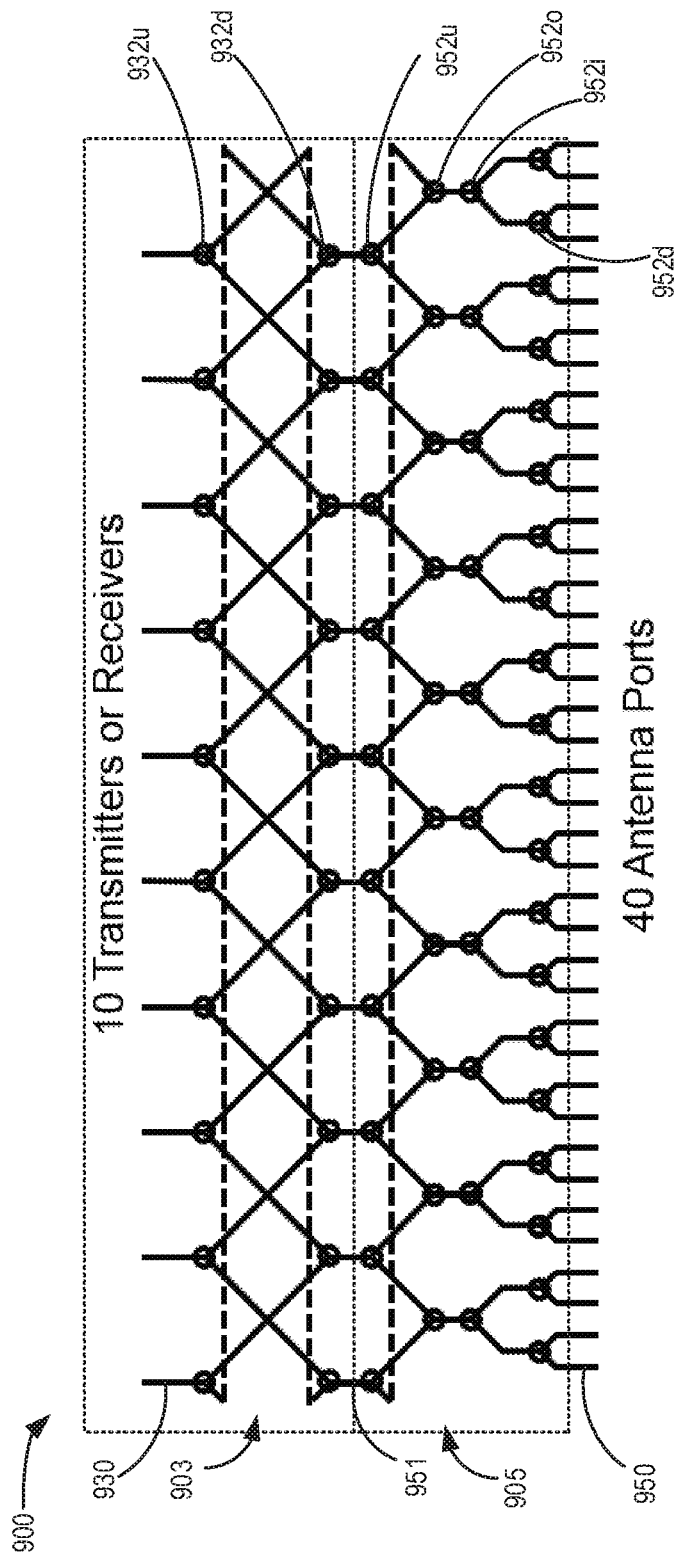
FIG. 9 is a diagram illustrating an example of a switch network system with switches having different switching speeds in accordance with an embodiment.

FIG. 9 illustrates an example of a switch network system 900. Switch network system 900 includes a plurality of signal inputs 930 (also referred to as redundancy signal transfer paths) coupled to a plurality of signal outputs 950 (also referred to as beam hopping signal transfer paths) via a redundancy network 903 and a beam hopping network 905. The signal inputs 930 can be communicably coupled to a first plurality of signal components, shown here as transceivers. The signal outputs 950 can be communicably coupled to a second plurality of signal components, shown here as antenna ports.

The redundancy network 903 includes a plurality of redundancy junctions 932. The beam hopping network 905 also includes a plurality of beam hopping junctions 952. In the system 900 shown in FIG. 9, the redundancy junctions 932 can be implemented as "slow" switches and the beam hopping junctions 952 can be implemented as "fast" switches.

In some embodiments, the "fast" switching beam hopping junctions 952 may have a switching rate that is 10 times faster than the "slow" switching redundancy junctions 932. In some cases, the "fast" switching beam hopping junctions 952 may have a switching rate that is at least 100 times faster than the "slow" switching redundancy junctions 932.

In some cases, the "fast" switching beam hopping junctions 952 may have much lower reconfiguration times than the "slow" switching redundancy junctions 932 (i.e. the beam hopping junctions 952 can be reconfigured much faster). For example, the "fast" switching beam hopping junctions 952 may have a reconfiguration time that is 10 times shorter/less than the "slow" switching redundancy junctions 932. In some cases, the "fast" switching beam hopping junctions 952 may have a reconfiguration time that is 100 times shorter/less than the "slow" switching redundancy junctions 932.

The "slow" switching redundancy junctions 932 may be configured to switch in response to the failure of one or more input components. In some cases, the redundancy junctions 932 may be switched only in response to a component failure.

The "fast" switching beam hopping junctions 952 may be configured to share capacity through the output ports between signals received from each of the input ports. The beam hopping junctions 952 may be configured to dynamically switch to reconfigure the beam hopping signal paths through the beam hopping network, while the redundancy signal paths are defined in response to each component failure. That is, the beam hopping signal paths may be dynamically reconfigurable by switching beam hopping junctions 952, but the redundancy signal paths may be constant absent the failure of a signal component.

In some embodiments, the fast switches 952 may switch at a rate of over 100 Hz. The fast switches may have a reconfiguration time of less than 10 µs. In contrast, the slow switches 932 may switch at a rate of less than 1 Hz. The slow switches 932 may have a reconfiguration time of less than 1 s.

There may be various advantages to embodiments using slow switches 932. For example, slow switches 932 may be implemented using different RF switch technology (as compared to fast switches 952), such as mechanical switches, which may provide cost, reliability, or packaging advantages. In some cases, the slow switches may be implemented using the same RF switch technology as fast switches 952, such as ferrite switches, but using a switch controller with lower cost/size/mass electronics. As well, because slow switches 932 may only be actuated after a component failure, redundant control electronics may not be required for the slow switches 932.

As shown in the drawings, the switch networks are drawn using 3 port circular symbols representing ferrite switching circulators. However, embodiments described herein may be generally implemented using any 1:2 switch technology sufficient for the system requirements of a particular implementation (e.g. switching time, power handling, insertion loss, isolation, size, mass, cost, etc.). Examples of switch technologies that may be used for the fast switches 952 may include ferrite switches and solid state switches, such as diode and field-effect transistor (FET) based switches, or other suitable technologies. Examples of switch technologies that may be used for the slow switches 932 can include any switches that satisfy the fast switch requirements. In some cases, the slow switches 932 may also be implemented using coaxial mechanical switches, waveguide mechanical "C" or "R" switches, or other suitable switches.

In certain embodiments, control electronics, including switching logic and drive current, can be used to electronically control the switch connectivity of a junction, such as a 1:2 switch junction or the direction of circulation for a ferrite switch junction. In some cases, a controller may be implemented using a computer processor, such as a general purpose microprocessor. In some other cases, the controller may be a field programmable gate array, application specific integrated circuit, microcontroller, or other suitable computer processor, or controller. The controller may also include one or more communication interfaces. A communication interface may be one or more data network interface, such as an IEEE 802.3 or IEEE 802.11 interface, for communication over a network. The controller may also include various other components such as input device(s), output device(s), and so on.

In some embodiments described herein, one or more switches can be grouped together and controlled using a common control/driver circuit. This may reduce the size, mass, and/or cost of the electronics used to control the switch network system.

Figure 10:
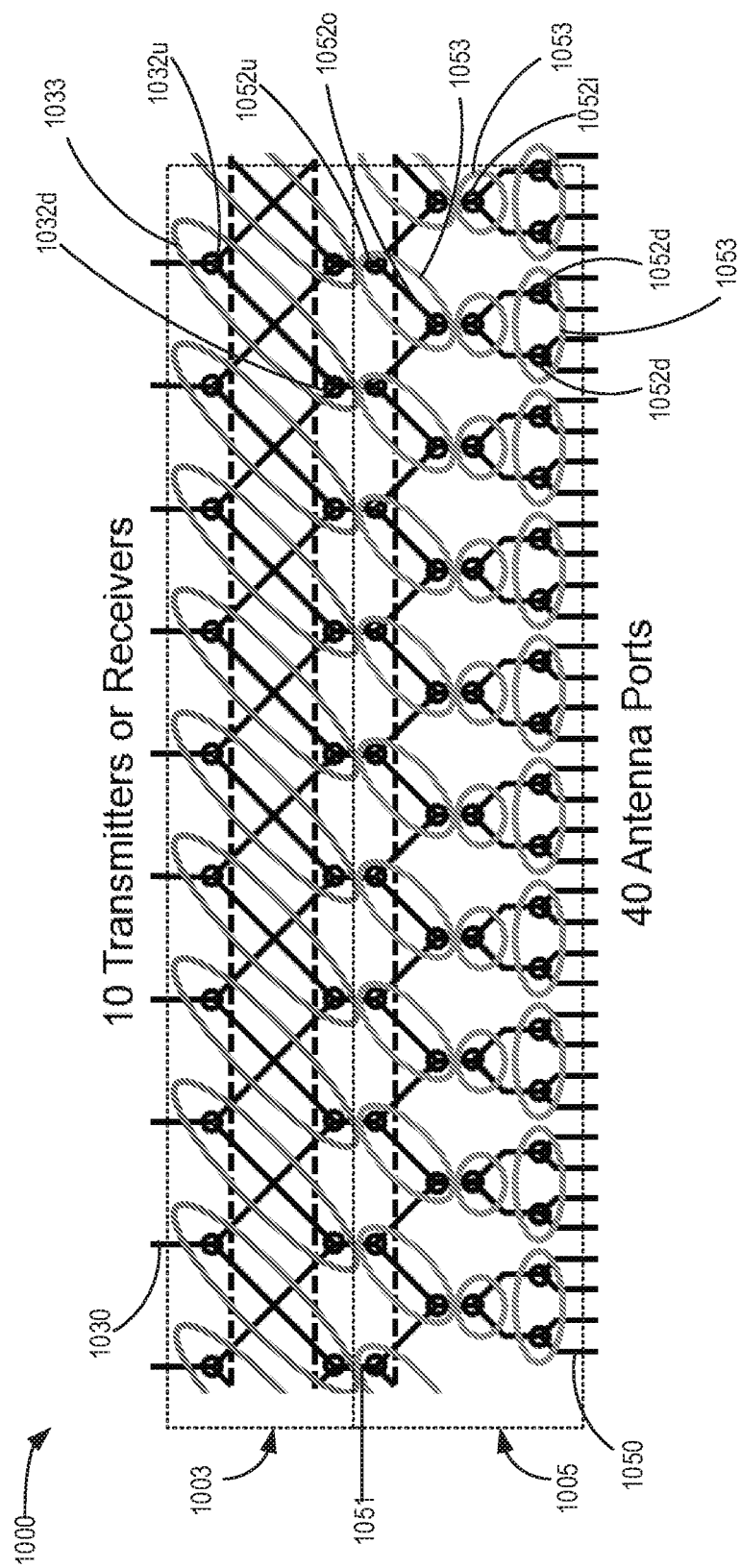
FIG. 10 is a diagram an example of a switch network system illustrating example switch controller configurations in accordance with an embodiment.

FIG. 10 illustrates an example of a switch network system 1000 showing an example of switch groupings of switch junctions that can be controlled by the same controller. System 1000 is configured to communicate signals from components coupled to the redundancy signal transfer paths 1030 to components coupled to beam hopping transfer path 1050, via redundancy network 1003, intermediate signal transfer path 1051, and beam hopping network 1005.

As with switch network system 900, switch network system 1000 includes a plurality of fast switches used to implement the beam hopping junctions 1052 in beam hopping network 1005. Switch network system 1000 also includes a plurality of slow switches used to implement the redundancy junctions 1032 in redundancy network 1003.

As shown in FIG. 10, the slow switching redundancy junctions 1032 can be grouped into a plurality of switch pairs 1033. Each switch pair can be controlled by a corresponding redundancy switch controller. In some embodiments, the redundancy switch controllers may be implemented as slow drivers.

The fast switching redundancy junctions 1052 can also be arranged into a plurality of beam hopping switch groups 1053. Each beam hopping switch group 1053 can be controlled by a corresponding beam hopping switch controller. As shown, the 50 fast switching redundancy junctions 1052 can be controlled by 30 beam hopping switch controllers. The beam hopping switch controllers may be implemented using fast drivers. In some cases, the beam hopping switch controllers may be implemented to include a plurality of redundant controllers. For example, in system 1000 the fast drivers may have a 2:1 or other redundancy, resulting in 30 standby fast drivers for a total of 60 fast drivers. In some embodiments, the redundancy switch controllers may be implemented without redundant controllers.

In the description above, the terms output and input have been used. It is intended that an output may also function as an input and an input may function as an output. For example, the beam hopping switching network may receive a signal from the redundancy network and provide a signal to an antenna port for transmission by an antenna. Conversely, the beam hopping switching network may also receive a signal from the antenna ports and provide the signal to the redundancy network for further processing by a receiver on the system communicating through redundancy network and beam hopping switch network.

Figure 11:
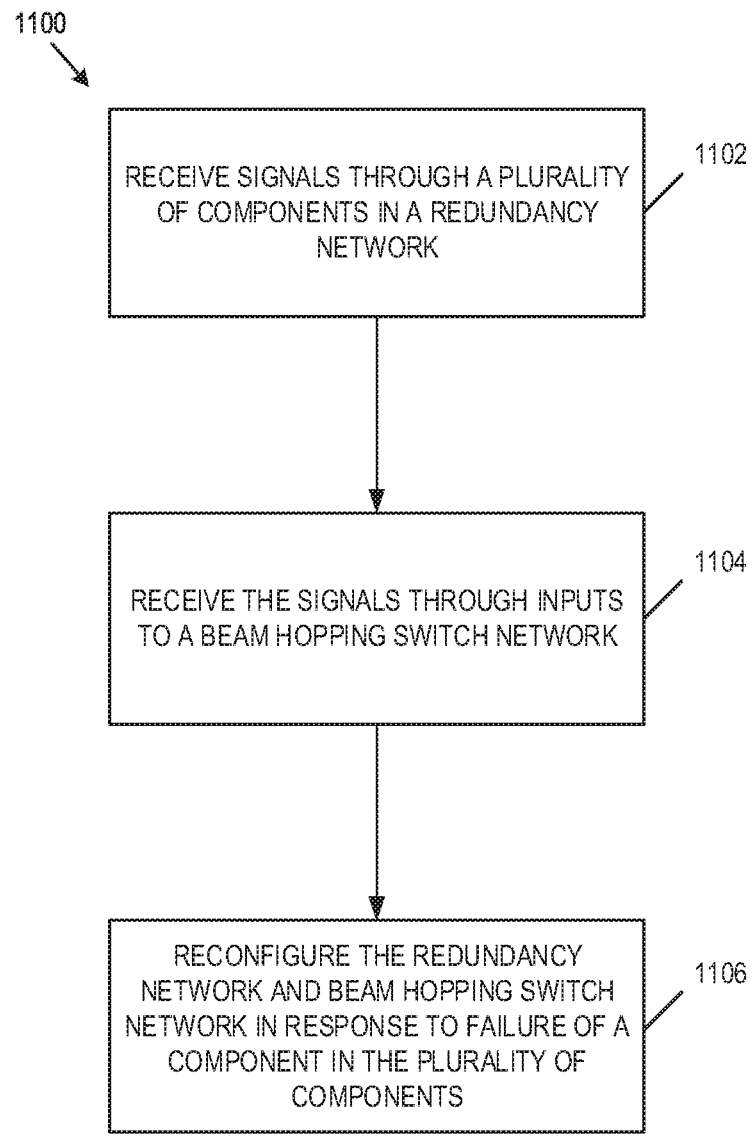
FIG. 11 is a flow diagram illustrating an example method for increasing capacity in a switch network system in accordance with an embodiment.

FIG. 11 is a flow diagram of a method 1100 for increasing capacity in a redundancy network. The method 1100 proceeds at 1102 where signals are received through a plurality of components in a redundancy network. The method 1100 proceeds at 1104, where the signals are received through inputs to a beam hopping switch network. When a component in the plurality of components fails, the method 1100 proceeds at 1106, where the redundancy network and the beam hopping switch network are reconfigured as described herein above.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. A switch network system comprising:
a redundancy network comprising a plurality of redundancy signal transfer paths configured to be communicably coupled to a first plurality of signal components, the redundancy network comprising a plurality of redundancy network signal junctions, wherein each redundancy network signal junction is configured as having one potential input path and two potential output paths; and
a beam hopping network comprising a plurality of beam hopping signal transfer paths configured to be communicably coupled to a second plurality of signal components and to a plurality of intermediate signal transfer paths communicably coupled to the redundancy network, the beam hopping network further comprising a plurality of beam hopping junctions configurable to define beam hopping signal paths between the intermediate signal transfer paths and the beam hopping signal transfer paths, wherein each beam hopping signal transfer path is configured as having one potential input path and two potential output paths;
wherein:
the plurality of redundancy network signal junctions are configurable to define a plurality of redundancy network signal paths between the redundancy signal transfer paths and the intermediate signal transfer paths whereby each redundancy signal transfer path has a different redundancy network signal path communicably coupling that redundancy signal transfer path to a corresponding intermediate signal transfer path;
the plurality of beam hopping junctions are dynamically adjustable to reconfigure the beam hopping signal paths between the intermediate signal transfer paths and the beam hopping signal transfer paths whereby signals from each redundancy signal transfer path are deliverable to at least two of the beam hopping signal transfer paths; and
the plurality of redundancy network signal junctions are reconfigurable in response to a failure of one of the signal components in the first plurality of signal components to redefine the redundancy network signal paths whereby signals from the remaining signal components in the first plurality of signal components are distributable to all of the beam hopping signal transfer paths.

2. The system of claim 1, wherein the plurality of redundancy network signal junctions comprises a plurality of first redundancy junctions with each first redundancy junction configured to be communicably coupled to one of the signal components in the first plurality of signal components and a plurality of second redundancy junctions, each second redundancy junction communicably coupled to two of the first redundancy junctions and to one of the intermediate signal transfer paths.

3. The system of claim 1, wherein
the plurality of beam hopping junctions comprises a plurality of sub-tree junctions arranged into a plurality of beam hopping sub-trees, each beam hopping sub-tree comprising a first sub-tree junction coupled to a plurality of second sub-tree junctions; and
each beam hopping signal path includes the first sub-tree junction and one of the second sub-tree junctions of one of the beam-hopping subtrees.

4. The system of claim 3, wherein each first sub-tree junction is coupled to at least two of the intermediate signal transfer paths and each downstream sub-tree junction is coupled to two of the beam hopping signal transfer paths.

5. The system of claim 1, wherein
the redundancy network signal junctions and beam hopping signal junctions are configured to distribute a first signal received from a first signal component in the first plurality of signal components to a first plurality of beam hopping signal transfer paths and to distribute a second signal received from a second signal component in the first plurality of signal components to a second plurality of beam hopping signal transfer paths; and
the second plurality of beam hopping signal transfer paths includes a greater number of signal transfer paths than the first plurality of beam hopping signal transfer paths.

6. The system of claim 1, wherein:
the redundancy network signal junctions are switchable at a first switching rate;
the beam hopping junctions are switchable at a second switching rate; and
the second switching rate is at least 10 times faster than the first switching rate.

7. The system of claim 6 wherein the second switching rate is at least 100 times faster than the first switching rate.

8. The system of claim 1, wherein
the redundancy network signal junctions have a first reconfiguration time;
the beam hopping junctions have a second reconfiguration time; and
the second reconfiguration time is at least 100 times shorter than the first reconfiguration time.

9. The system of claim 2, further comprising:
a plurality of redundancy switch controllers coupled to the plurality of redundancy network signal junctions;
wherein
the plurality of redundancy network signal junctions comprises a plurality of redundancy junction pairs, with each redundancy junction pair including one of the first redundancy junctions and one of the second redundancy junctions; and
each of the redundancy junction pairs has a corresponding redundancy pair controller in the plurality of redundancy switch controllers.

10. The system of claim 9, wherein the plurality of redundancy switch controllers are configured to reconfigure the redundancy network signal junctions only in response to the failure of one of the signal components.

11. A signal switching method comprising:
receiving signals from a plurality of signal components;
directing the received signals to a plurality of intermediate signal transfer paths through a plurality of redundancy network signal junctions, wherein the plurality of redundancy network signal junctions define a plurality of redundancy network signal paths between the signal components and the intermediate signal transfer paths with each signal component having a different redundancy network signal paths, wherein each redundancy network signal junction is configured as having one potential input path and two potential output paths;
routing the signals from the intermediate signal transfer paths to a plurality of beam hopping signal transfer paths through a plurality of beam hopping junctions, the plurality of beam hopping junctions defining beam hopping signal paths between the intermediate signal transfer paths and the beam hopping signal transfer paths, wherein each beam hopping signal transfer path is configured as having one potential input path and two potential output paths;
detecting a failure of one of the signal components; and
reconfiguring the plurality of redundancy network signal junctions by switching at least one of the redundancy network signal junctions to redefine the redundancy network signal path for at least one of the remaining signal components in response to the detected failure, wherein the redefined redundancy network signal paths enable signals received from the remaining signal components to be distributed to all of the beam hopping signal transfer paths.

12. The method of claim 11, wherein the plurality of beam hopping junctions are dynamically reconfigurable to adjust the beam hopping signal paths between the intermediate signal transfer paths and the beam hopping signal transfer paths.

13. The method of claim 11, wherein routing the signals from the intermediate signal transfer paths to the plurality of beam hopping signal transfer paths comprises routing the signals through a plurality of beam hopping sub-trees, each beam hopping sub-tree comprising a first sub-tree junction coupled to a plurality of second sub-tree junctions wherein each beam hopping signal path includes the first sub-tree junction and one of the second sub-tree junctions of one of the beam-hopping subtrees.

14. The method of claim 13, further comprising:
dynamically adjusting each first sub-tree junction to receive signals from one of at least two intermediate signal transfer paths and each second sub-tree junction to route the received signal to one of two beam hopping signal transfer paths coupled to that second sub-tree junction.

15. The method of claim 11, further comprising:
directing a first received signal to a first intermediate signal transfer path communicably connectable to a first plurality of beam hopping signal transfer paths via the beam hopping junctions; and
directing a second received signal to a second intermediate signal transfer path communicably connectable to a second plurality of beam hopping signal transfer paths via the beam hopping signal junctions;
wherein the second plurality of beam hopping signal transfer paths includes a greater number of beam hopping signal transfer paths than the first plurality of beam hopping signal transfer paths.

16. The method of claim 11, further comprising:
switching the redundancy network signal junctions at a first switching rate; and
switching the beam hopping junctions at a second switching rate that is at least 10 times faster than the first switching rate.

17. The method of claim 16 wherein the second switching rate is at least 100 times faster than the first switching rate.

18. The method of claim 11, wherein
switching the redundancy network signal junctions requires a first reconfiguration time;
switching the redundancy network signal junctions requires a second reconfiguration time; and
the second reconfiguration time is at least 100 times shorter than the first reconfiguration time.

19. The method of claim 12, further comprising:
controlling the redundancy network signal junctions using a plurality of redundancy switch controllers;
wherein
the plurality of redundancy network signal junctions comprises a plurality of redundancy junction pairs, with each redundancy junction pair including one of the first redundancy junctions and one of the second redundancy junctions; and
each redundancy junction pairs is controlled by one of the redundancy switch controllers.

20. The method of claim 19, further comprising:
reconfiguring the redundancy network signal junctions only in response to the failure of one of the signal components.

* * * * *